United States Patent
Ponnuswamy et al.

(10) Patent No.: US 11,102,053 B2
(45) Date of Patent: Aug. 24, 2021

(54) CROSS-DOMAIN ASSURANCE

(71) Applicant: Cisco Technology, Inc., San Jose, CA (US)

(72) Inventors: Kannan Ponnuswamy, Murphy, TX (US); Alok Lalit Wadhwa, Milpitas, CA (US); Furong Ma Gisiger, San Francisco, CA (US); Robert Bukofser, Mason, NH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 738 days.

(21) Appl. No.: 15/831,708

(22) Filed: Dec. 5, 2017

(65) Prior Publication Data
US 2019/0173736 A1      Jun. 6, 2019

(51) Int. Cl.
*G06F 15/16*      (2006.01)
*H04L 12/24*      (2006.01)
*H04L 12/26*      (2006.01)

(52) U.S. Cl.
CPC ........ *H04L 41/0631* (2013.01); *H04L 41/145* (2013.01); *H04L 43/04* (2013.01); *H04L 43/12* (2013.01)

(58) Field of Classification Search
CPC ... H04L 41/0631; H04L 41/145; H04L 43/04; H04L 43/12
See application file for complete search history.

(56) References Cited

U.S. PATENT DOCUMENTS

| 5,204,829 A | 4/1993 | Lyu et al. |
| 6,763,380 B1 | 7/2004 | Mayton et al. |

(Continued)

FOREIGN PATENT DOCUMENTS

| CN | 105471830 | 4/2016 |
| CN | 105721193 | 6/2016 |

(Continued)

OTHER PUBLICATIONS

Maldonado-Lopez, Ferney, et al., "Detection and prevention of firewall-rule conflicts on software-defined networking," 2015 7th International Workshop on Reliable Networks Design and Modeling (RNDM), IEEE, Oct. 5, 2015, pp. 259-265.

(Continued)

*Primary Examiner* — Normin Abedin
(74) *Attorney, Agent, or Firm* — Polsinelli PC

(57) ABSTRACT

Systems, methods, and computer-readable media for providing network assurance across a network. In some embodiments, network traffic data of a cluster of nodes in a network environment can be gathered based on first network traffic flowing through the nodes using a first group of sensors implemented in the network environment. Network events occurring in the network environment can be identified, e.g. using sensors deployed in an infrastructure of the network environment. Subsequently, the network events can be correlated with the network traffic data to generate correlated network data for the network environment. The correlated network data for the network environment can be used to provide assurance between at least one server in the cluster of nodes and the network infrastructure of the network environment as part of providing assurance across the network environment.

20 Claims, 16 Drawing Sheets

(56) References Cited

U.S. PATENT DOCUMENTS

| | | |
|---|---|---|
| 7,003,562 B2 | 2/2006 | Mayer |
| 7,089,369 B2 | 8/2006 | Emberling |
| 7,127,686 B2 | 10/2006 | Dreschler et al. |
| 7,360,064 B1 | 4/2008 | Steiss et al. |
| 7,453,886 B1 | 11/2008 | Allan |
| 7,505,463 B2 | 3/2009 | Schuba et al. |
| 7,548,967 B2 | 6/2009 | Amyot et al. |
| 7,552,201 B2 | 6/2009 | Areddu et al. |
| 7,609,647 B2 | 10/2009 | Turk et al. |
| 7,619,989 B2 | 11/2009 | Guingo et al. |
| 7,698,561 B2 | 4/2010 | Nagendra et al. |
| 7,743,274 B2 | 6/2010 | Langford et al. |
| 7,765,093 B2 | 7/2010 | Li et al. |
| 8,010,952 B2 | 8/2011 | Datla et al. |
| 8,073,935 B2 | 12/2011 | Viswanath |
| 8,103,480 B2 | 1/2012 | Korn et al. |
| 8,190,719 B2 | 5/2012 | Furukawa |
| 8,209,738 B2 | 6/2012 | Nicol et al. |
| 8,261,339 B2 | 9/2012 | Aldridge et al. |
| 8,312,261 B2 | 11/2012 | Rao et al. |
| 8,375,117 B2 | 2/2013 | Venable, Sr. |
| 8,441,941 B2 | 5/2013 | McDade et al. |
| 8,479,267 B2 | 7/2013 | Donley et al. |
| 8,484,693 B2 | 7/2013 | Cox et al. |
| 8,494,977 B1 | 7/2013 | Yehuda et al. |
| 8,554,883 B2 | 8/2013 | Sankaran |
| 8,589,934 B2 | 11/2013 | Makljenovic et al. |
| 8,621,284 B2 | 12/2013 | Kato |
| 8,627,328 B2 | 1/2014 | Mousseau et al. |
| 8,693,344 B1 | 4/2014 | Adams et al. |
| 8,693,374 B1 | 4/2014 | Murphy et al. |
| 8,761,036 B2 | 6/2014 | Fulton et al. |
| 8,782,182 B2 | 7/2014 | Chaturvedi et al. |
| 8,824,482 B2 | 9/2014 | Kajekar et al. |
| 8,910,143 B2 | 12/2014 | Cohen et al. |
| 8,914,843 B2 | 12/2014 | Bryan et al. |
| 8,924,798 B2 | 12/2014 | Jerde et al. |
| 9,019,840 B2 | 4/2015 | Salam et al. |
| 9,038,151 B1 | 5/2015 | Chua et al. |
| 9,055,000 B1 | 6/2015 | Ghosh et al. |
| 9,106,555 B2 | 8/2015 | Agarwal et al. |
| 9,137,096 B1 | 9/2015 | Yehuda et al. |
| 9,225,601 B2 | 12/2015 | Khurshid et al. |
| 9,246,818 B2 | 1/2016 | Deshpande et al. |
| 9,264,922 B2 | 2/2016 | Gillot et al. |
| 9,276,877 B1 | 3/2016 | Chua et al. |
| 9,319,300 B2 | 4/2016 | Huynh Van et al. |
| 9,344,348 B2 | 5/2016 | Ivanov et al. |
| 9,369,434 B2 | 6/2016 | Kim et al. |
| 9,389,993 B1 | 7/2016 | Okmyanskiy et al. |
| 9,405,553 B2 | 8/2016 | Branson et al. |
| 9,444,842 B2 | 9/2016 | Porras et al. |
| 9,497,207 B2 | 11/2016 | Dhawan et al. |
| 9,497,215 B2 | 11/2016 | Vasseur et al. |
| 9,544,224 B2 | 1/2017 | Chu et al. |
| 9,548,965 B2 | 1/2017 | Wang et al. |
| 9,553,845 B1 | 1/2017 | Talmor et al. |
| 9,571,502 B2 | 2/2017 | Basso et al. |
| 9,571,523 B2 | 2/2017 | Porras et al. |
| 9,594,640 B1 | 3/2017 | Chheda |
| 9,596,141 B2 | 3/2017 | McDowall |
| 9,641,249 B2 | 5/2017 | Kaneriya et al. |
| 9,654,300 B2 | 5/2017 | Pani |
| 9,654,361 B2 | 5/2017 | Vasseur et al. |
| 9,654,409 B2 | 5/2017 | Yadav et al. |
| 9,660,886 B1 | 5/2017 | Ye et al. |
| 9,660,897 B1 | 5/2017 | Gredler |
| 9,667,645 B1 | 5/2017 | Belani et al. |
| 9,680,875 B2 | 6/2017 | Knjazihhin et al. |
| 9,686,180 B2 | 6/2017 | Chu et al. |
| 9,690,644 B2 | 6/2017 | Anderson et al. |
| 9,781,004 B2 | 10/2017 | Danait et al. |
| 9,787,559 B1 | 10/2017 | Schroeder |
| 9,998,247 B1 | 6/2018 | Choudhury et al. |
| 10,084,795 B2 | 9/2018 | Akireddy et al. |
| 10,084,833 B2 | 9/2018 | McDonnell et al. |
| 10,084,895 B2 | 9/2018 | Kasat et al. |
| 2002/0143855 A1 | 10/2002 | Traversat et al. |
| 2003/0229693 A1 | 12/2003 | Mahlik et al. |
| 2004/0073647 A1 | 4/2004 | Gentile et al. |
| 2004/0168100 A1 | 8/2004 | Thottan et al. |
| 2005/0108389 A1 | 5/2005 | Kempin et al. |
| 2007/0124437 A1 | 5/2007 | Chervets |
| 2007/0214244 A1 | 9/2007 | Hitokoto et al. |
| 2008/0031147 A1 | 2/2008 | Fieremans et al. |
| 2008/0117827 A1 | 5/2008 | Matsumoto et al. |
| 2008/0133731 A1 | 6/2008 | Bradley et al. |
| 2008/0172716 A1 | 7/2008 | Talpade et al. |
| 2009/0240758 A1 | 9/2009 | Pasko et al. |
| 2009/0249284 A1 | 10/2009 | Antosz et al. |
| 2010/0191612 A1 | 7/2010 | Raleigh |
| 2010/0198909 A1 | 8/2010 | Kosbab et al. |
| 2011/0093612 A1 | 4/2011 | Murakami |
| 2011/0295983 A1 | 12/2011 | Medved et al. |
| 2012/0054163 A1 | 3/2012 | Liu et al. |
| 2012/0198073 A1 | 8/2012 | Srikanth et al. |
| 2012/0297061 A1 | 11/2012 | Pedigo et al. |
| 2013/0097660 A1 | 4/2013 | Das et al. |
| 2013/0298192 A1* | 11/2013 | Kumar .................. G06F 21/52 726/3 |
| 2014/0019597 A1 | 1/2014 | Nath et al. |
| 2014/0177638 A1 | 6/2014 | Bragg et al. |
| 2014/0222996 A1 | 8/2014 | Vasseur et al. |
| 2014/0304831 A1 | 10/2014 | Hidlreth et al. |
| 2014/0307556 A1 | 10/2014 | Zhang |
| 2014/0321277 A1 | 10/2014 | Lynn, Jr. et al. |
| 2014/0379915 A1 | 12/2014 | Yang et al. |
| 2015/0019756 A1 | 1/2015 | Masuda |
| 2015/0113143 A1 | 4/2015 | Stuart et al. |
| 2015/0124826 A1 | 5/2015 | Edsall et al. |
| 2015/0244617 A1 | 8/2015 | Nakil et al. |
| 2015/0271104 A1 | 9/2015 | Chikkamath et al. |
| 2015/0365314 A1 | 12/2015 | Hiscock et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0080350 A1 | 3/2016 | Chaturvedi et al. |
| 2016/0099883 A1 | 4/2016 | Voit et al. |
| 2016/0149751 A1 | 5/2016 | Pani et al. |
| 2016/0164748 A1 | 6/2016 | Kim |
| 2016/0241436 A1 | 8/2016 | Fourie et al. |
| 2016/0267384 A1 | 9/2016 | Salam et al. |
| 2016/0352566 A1 | 12/2016 | Mekkattuparamban et al. |
| 2016/0380892 A1 | 12/2016 | Mahadevan et al. |
| 2017/0026292 A1 | 1/2017 | Smith et al. |
| 2017/0031800 A1 | 2/2017 | Shani et al. |
| 2017/0048126 A1 | 2/2017 | Handige Shankar et al. |
| 2017/0063599 A1* | 3/2017 | Wu .................. H04L 41/5035 |
| 2017/0093630 A1 | 3/2017 | Foulkes |
| 2017/0093664 A1 | 3/2017 | Lynam et al. |
| 2017/0093750 A1 | 3/2017 | McBride et al. |
| 2017/0093918 A1 | 3/2017 | Banerjee et al. |
| 2017/0111259 A1 | 4/2017 | Wen et al. |
| 2017/0118167 A1 | 4/2017 | Subramanya et al. |
| 2017/0126740 A1 | 5/2017 | Bejarano Ardila et al. |
| 2017/0126792 A1 | 5/2017 | Halpern et al. |
| 2017/0134233 A1 | 5/2017 | Dong et al. |
| 2017/0163442 A1 | 6/2017 | Shen et al. |
| 2017/0187577 A1 | 6/2017 | Nevrekar et al. |
| 2017/0195187 A1 | 7/2017 | Bennett et al. |
| 2017/0206129 A1 | 7/2017 | Yankilevich et al. |
| 2017/0353355 A1 | 12/2017 | Danait et al. |
| 2018/0167294 A1 | 6/2018 | Gupta et al. |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |

(56) References Cited

FOREIGN PATENT DOCUMENTS

| WO | WO 2016/039730 | 3/2016 |
|---|---|---|
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

Akella, Aditya, et al., "A Highly Available Software Defined Fabric," HotNets—XIII, Oct. 27-28, 2014, Los Angeles, CA, USA, Copyright 2014, ACM, pp. 1-7.

Alsheikh, Mohammad Abu, et al., "Machine Learning in Wireless Sensor Networks: Algorithms, Strategies, and Application," Mar. 19, 2015, pp. 1-23.

Author Unknown, "Aids to Pro-active Management of Distributed Resources through Dynamic Fault-Localization and Availability Prognosis," FaultLocalization—TR01—CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco Systems, Inc., "Cisco Application Centric Infrastructure 9ACI Endpoint Groups (EPG) Usange and Design," White Paper, May 2014, pp. 1-14.

Cisco, "Verify Contracts and Rules in the ACI Fabric," Cisco, Updated Aug. 19, 2016, Document ID: 119023, pp. 1-20.

de Silva et al., "Network-wide Security Analysis," Semantic Scholar, Oct. 25, 2011, pp. 1-11.

Dhawan, Mohan, et al., "Sphinx: Detecting Security Attacks in Software-Defined Networks," NDSS 2015, Feb. 8-11, 2015, San Diego, CA, USA, Copyright 2015 Internet Society, pp. 1-15.

Fayaz, Seyed K., et al., "Efficient Network Reachability Analysis using a Succinct Control Plane Representation," 2016, ratul.org, pp. 1-16.

Feldmann, Anja, et al., "IP Network Configuration for Intradomain Traffic Engineering," Semantic Scholar, accessed on Jul. 20, 2017, pp. 1-27.

Han, Wonkyu, et al., "LPM: Layered Policy Management for Software-Defined Networks," Mar. 8, 2016, pp. 1-8.

Han, Yoonseon, et al., "An Intent-based Network Virtualization Platform for SDN," 2016 I FIP, pp. 1-6.

Kazemian, Peyman, et al., "Real Time Network Policy Checking using Header Space Analysis," USENIX Association, 10th USENIX Symposium on Networked Systems Design and Implementation (NSDI '13) pp. 99-111.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU-CyLab-06-008, May 23, 2006, pp. 1-14.

Liang, Chieh-Jan Mike, et al., "Sift: Building an Internet of Safe Things," Microsoft, IPSN' 15, Apr. 14-16, 2015, Seattle, WA, ACM 978, pp. 1-12.

Lindem, A., et al., "Network Device Yang Organizational Model draft-rtgyangdt-rtgwg-device-model-01," Network Working Group, Internet-draft, Sep. 21, 2015, pp. 1-33.

Liu, Jason, et al., "A Real-Time Network Simulation Infrastructure Based on Open VPN," Journal of Systems and Software, Aug. 4, 2008, pp. 1-45.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

Miller, Nancy, et al., "Collecting Network Status Information for Network-Aware Applications," INFOCOM 2000, pp. 1-10.

Miranda, Joao Sales Henriques, "Fault Isolation in Software Defined Networks," www.gsd.inescid.pt, pp. 1-10.

Moon, Daekyeong, et al., "Bridging the Software/Hardware Forwarding Divide," Berkeley.edu, Dec. 18, 2010, pp. 1-15.

Panda, Aurojit, et al., "SCL: Simplifying Distributed SDN Control Planes," people.eecs.berkeley.edu, Mar. 2017, pp. 1-17.

Shin, Seugwon, et al., "Fresco: Modular Composable Security Services for Software-Defined Networks," To appear in the ISOC Network and Distributed System Security Symposium, Feb. 2013, pp. 1-16.

Shukla, Apoorv, et al., "Towards meticulous data plane monitoring," kaust.edu.sa, access on Aug. 1, 2017, pp. 1-2.

Tang, Yongning, et al., "Automatic belief network modeling via policy inference for SDN fault localization," Journal of Internet Services and Applications, 2016, pp. 1-13.

Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.

Tongaonkar, Alok, et al., "Inferring Higher Level Policies from Firewall Rules," Proceedings of the 21st Large Installation System Administration Conference (LISA '07), Nov. 11-16, 2007, pp. 1-14.

Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

Zhou, Shijie, et al., "High-Performance Packet Classification on GPU," 2014 IEEE, pp. 1-6.

* cited by examiner

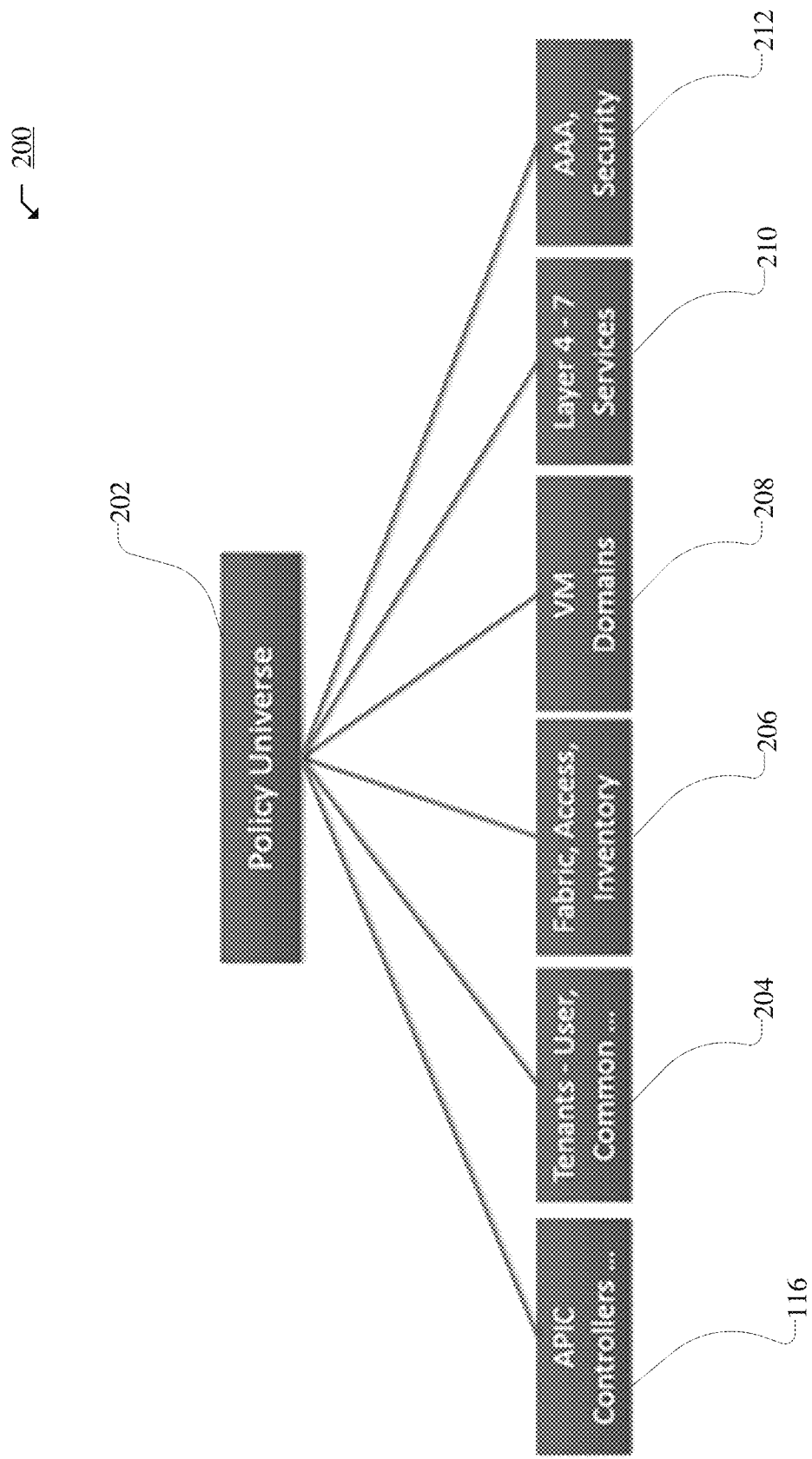

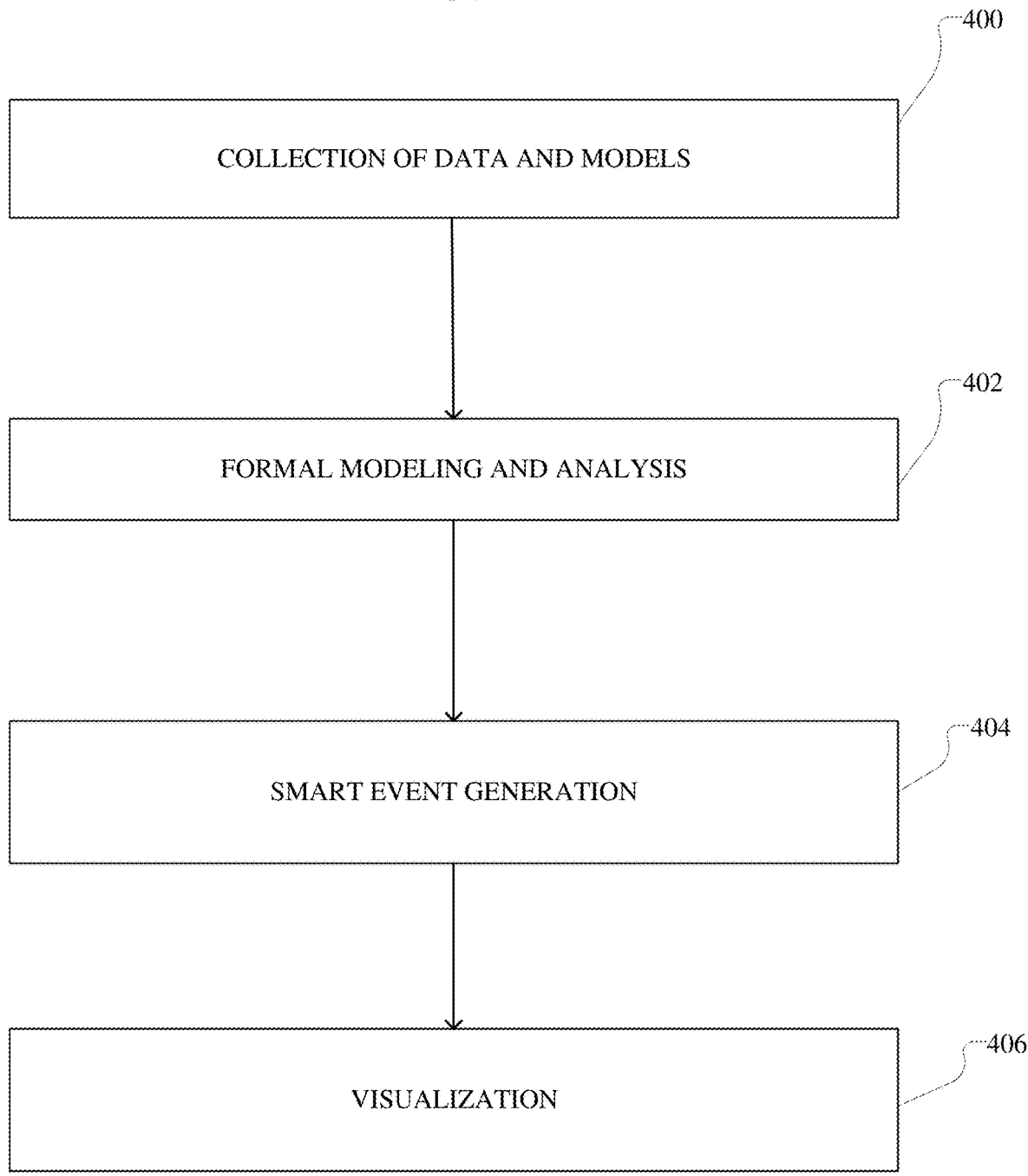

FIG. 9

CROSS-DOMAIN ASSURANCE

CROSS-DOMAIN ASSURANCE

The present technology pertains to network assurance, and more specifically to providing assurance across a network otherwise referred to as cross-domain assurance between servers and an infrastructure of a network environment.

BACKGROUND

Currently, sensors deployed in a network can be used to gather network traffic data related to nodes operating in the network. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The network traffic data can be analyzed to provide insights into the operation of the nodes in the network, otherwise referred to as analytics. In particular, discovered application or inventories, application dependencies, policies, efficiencies, resource and bandwidth usage, and network flows can be determined for the network using the network traffic data.

Additionally, events can be generated for a network fabric/infrastructure. Events can be generated based on operation of a network fabric to provide network services. For example, events can be generated for switches in a network fabric that fail policy tests.

Currently, there are not systems and methods to integrate events generated in a network fabric with network traffic data from non-fabric sources such physical servers, virtual servers/VMs/Containers or appliances using the network or any distributed sensors that are on those systems using the fabric. This leads to deficiencies in providing assurance across an entire network. More specifically, this leads to deficiencies in providing assurance across servers and an SDN infrastructure/ACI of a network. For example, a server might appear to be functioning properly according to network traffic data while the server is actually incompatible with a network fabric thereby limiting an ability of the server to provide access to network services using the network fabric.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A illustrates an example object model for a network;

FIG. 4 illustrates an example method embodiment for network assurance;

FIG. 9 illustrates an example network device in accordance with various embodiments.

DESCRIPTION OF EXAMPLE EMBODIMENTS

Figure 1A:
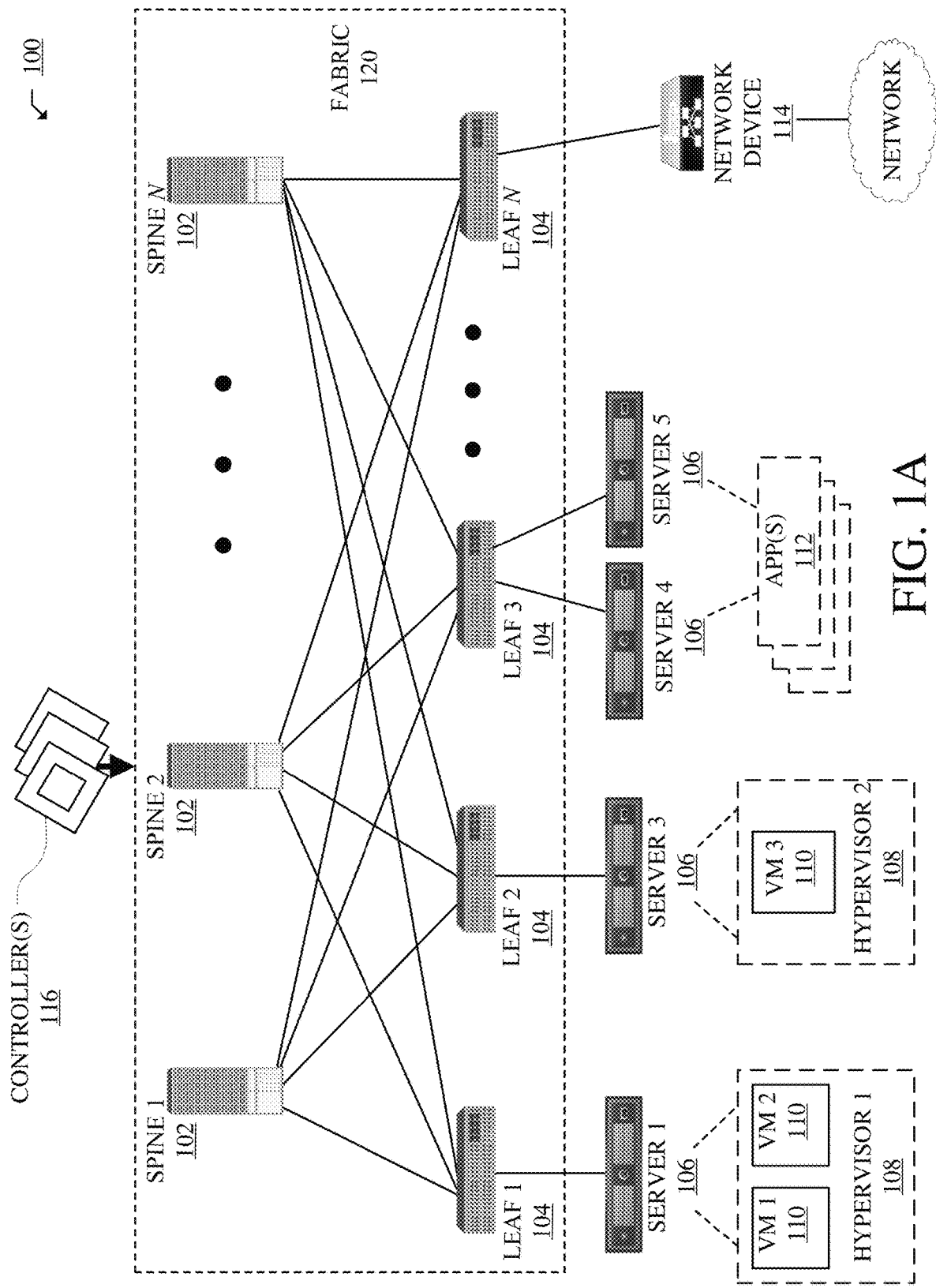
FIGS. 1A and 1B illustrate example network environments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Network traffic data of a cluster of nodes in a network environment can be gathered based on first network traffic flowing through the nodes using a first group of sensors implemented in the network environment. Network events occurring in the network environment can be identified, e.g. using sensors deployed in an infrastructure of the network environment. Subsequently, the network events can be correlated with the network traffic data to generate correlated network data for the network environment. The correlated network data for the network environment can be used to provide assurance between at least one server in the cluster of nodes and the network infrastructure of the network environment, as part of providing assurance across the network environment.

A system can receive network traffic data of a cluster of nodes using a first group of sensors implemented in a network environment. Server data of at least one server included in the cluster of nodes in the network environment can be received from at least one sensor implemented on the at least one server. Additionally, the system can identify network events occurring in the network environment. Subsequently, the network events, the server data, and the network traffic data can be correlated to generate correlated network data for the network environment. The system can use the correlated network data for the network environment to provide assurance between the at least one server and a network infrastructure of the network environment.

A system can receive network traffic data of a cluster of nodes using a first group of sensors implemented in a network environment. Additionally, the system can identify network events occurring in a network infrastructure of the network environment. Subsequently, the network events and the network traffic data can be correlated to generate correlated network data for the network environment. The system can use the correlated network data for the network environment to provide assurance between the at least one server and a network infrastructure of the network environment by identifying a mismatch between intent of a network administrator of the network infrastructure and a server administrator of at least one server in the network environment.

EXAMPLE EMBODIMENTS

Figure 1B:
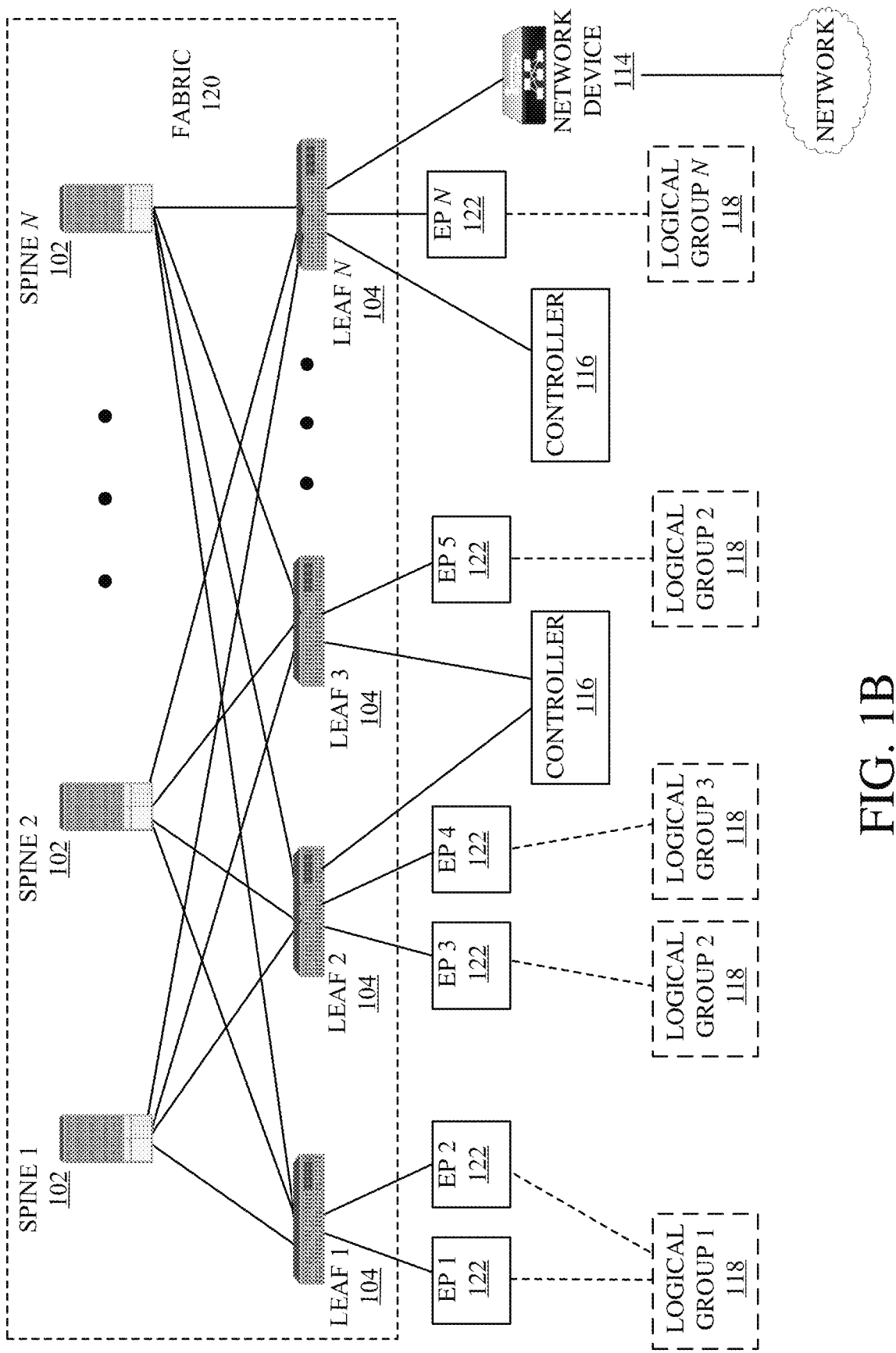
Figure 5:
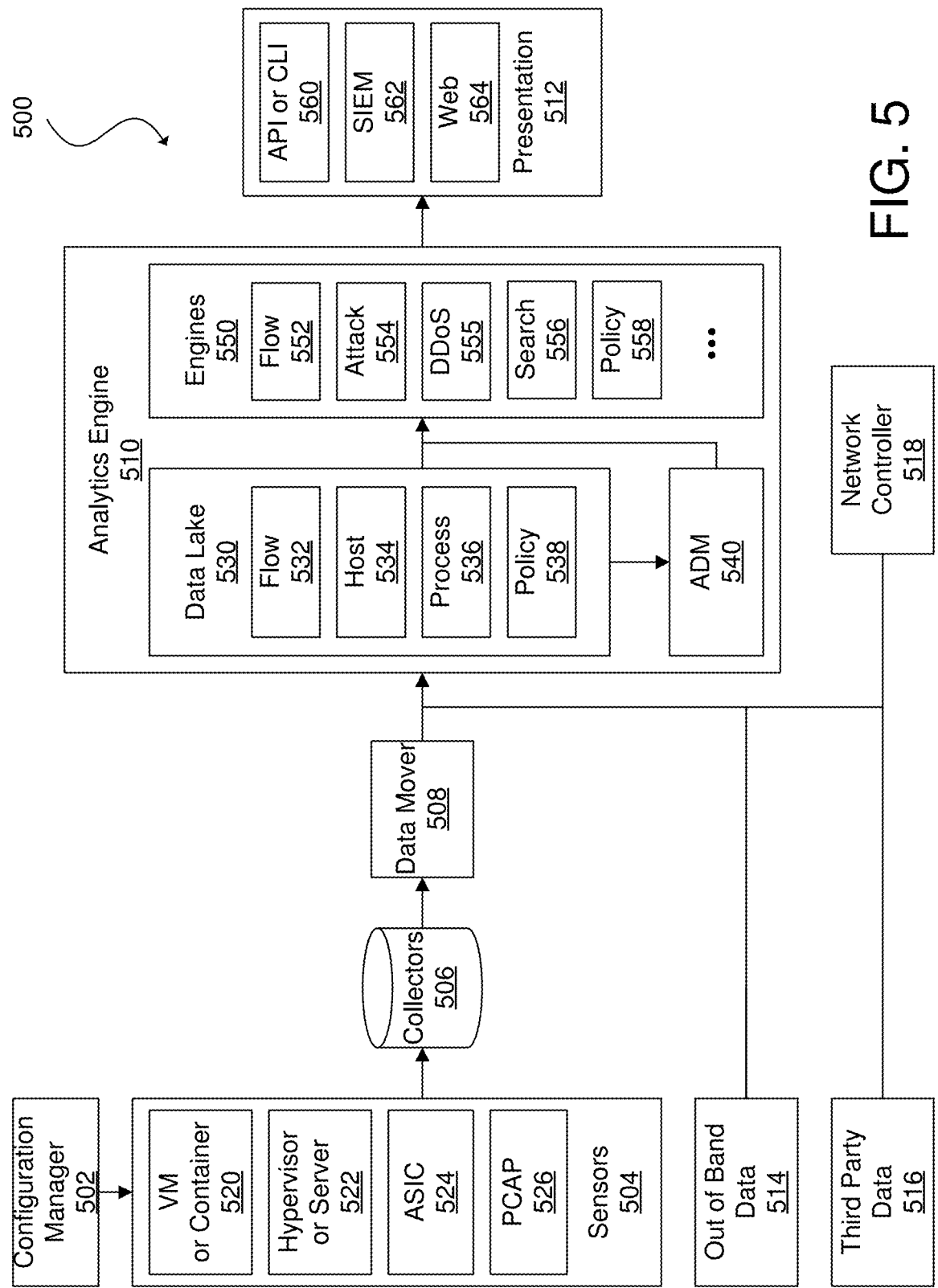
FIG. 5 is an illustration of a network traffic monitoring system 500 in accordance with an embodiment.
Figure 6:
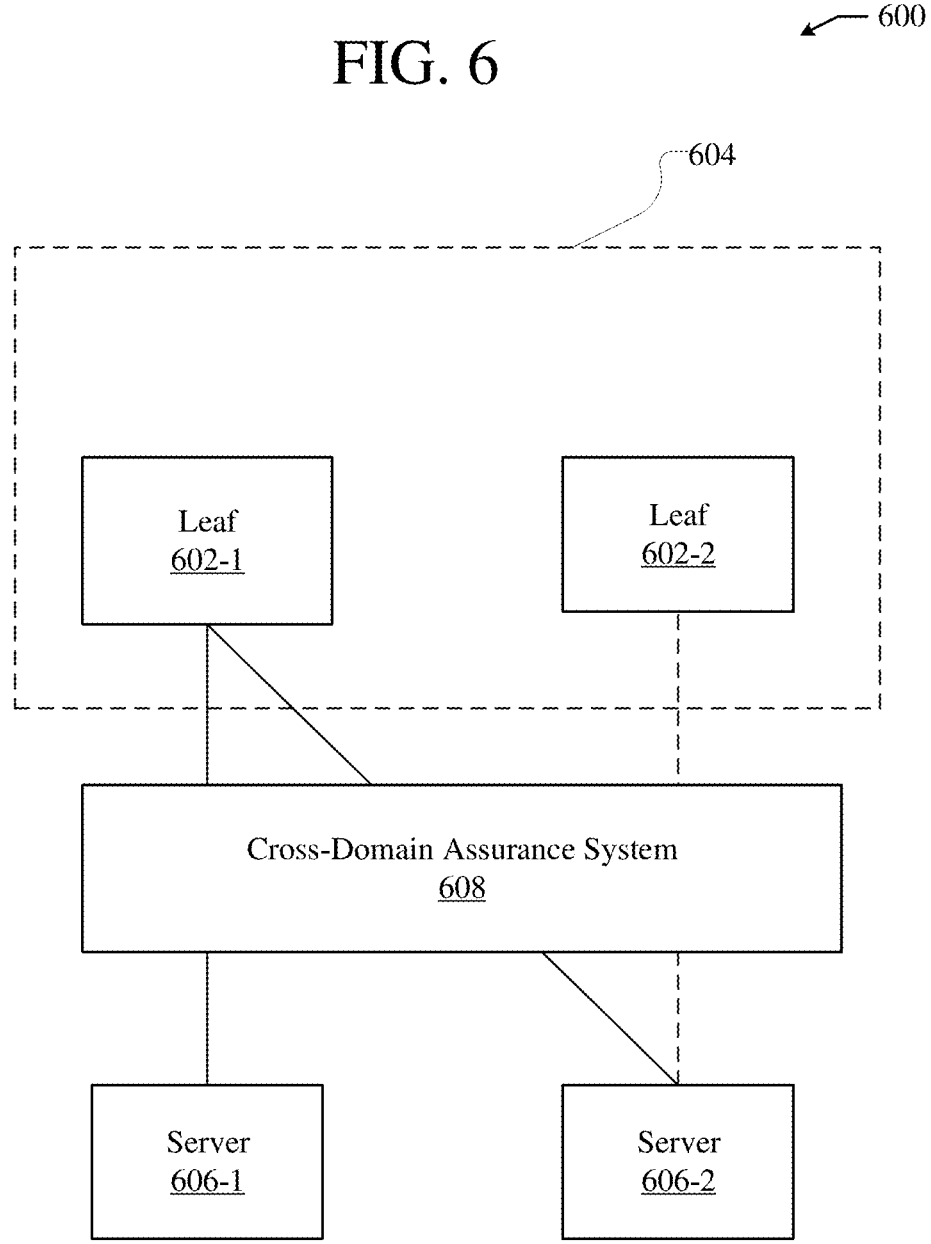
FIG. 6 illustrates an example network environment that a cross-domain assurance system can provide assurance across.
Figure 7:
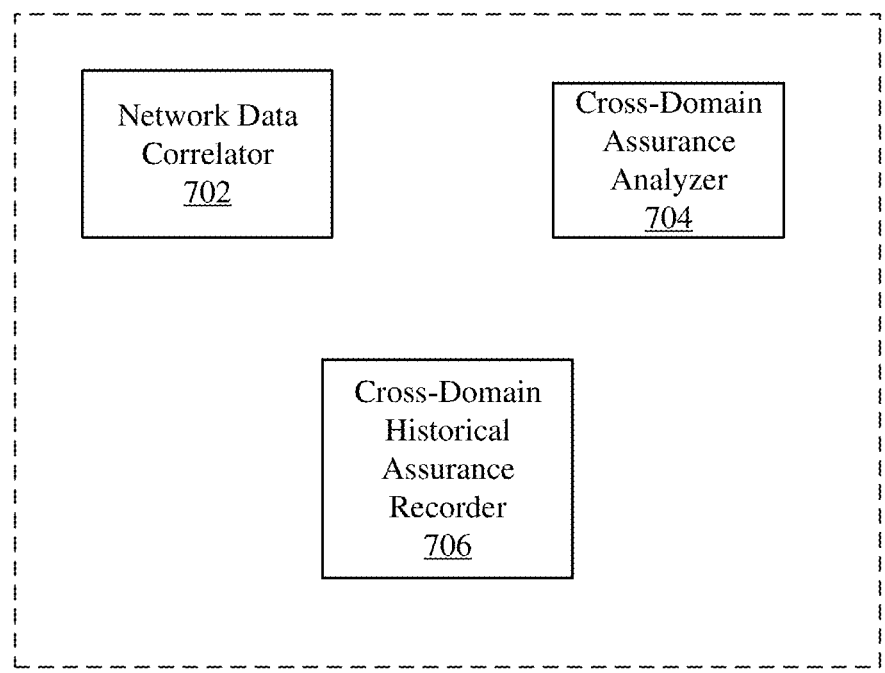
FIG. 7 illustrates an example cross-domain assurance system.
Figure 8:
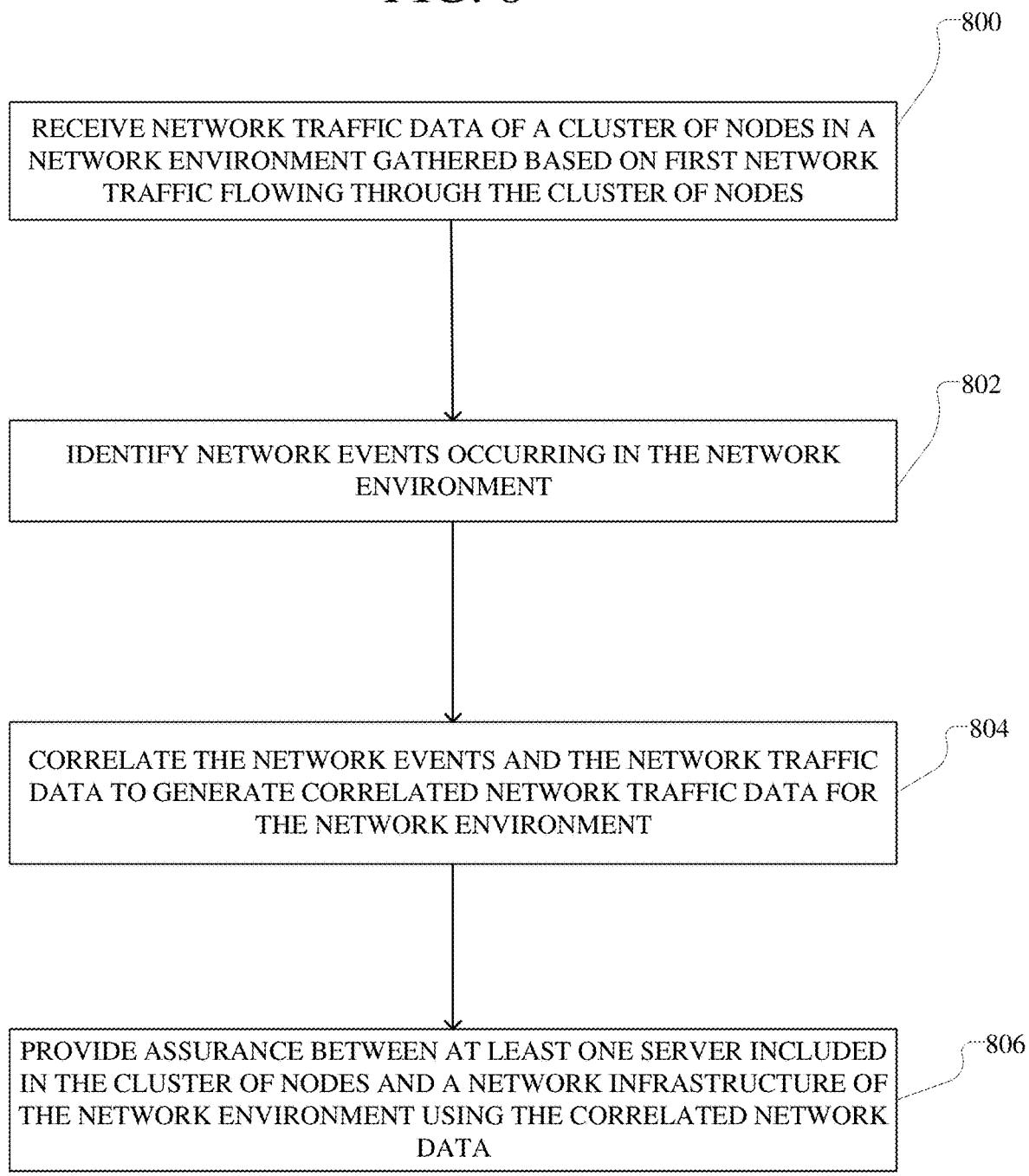
FIG. 8 illustrates an example method of providing cross-domain assurance in a network environment.
Figure 9:
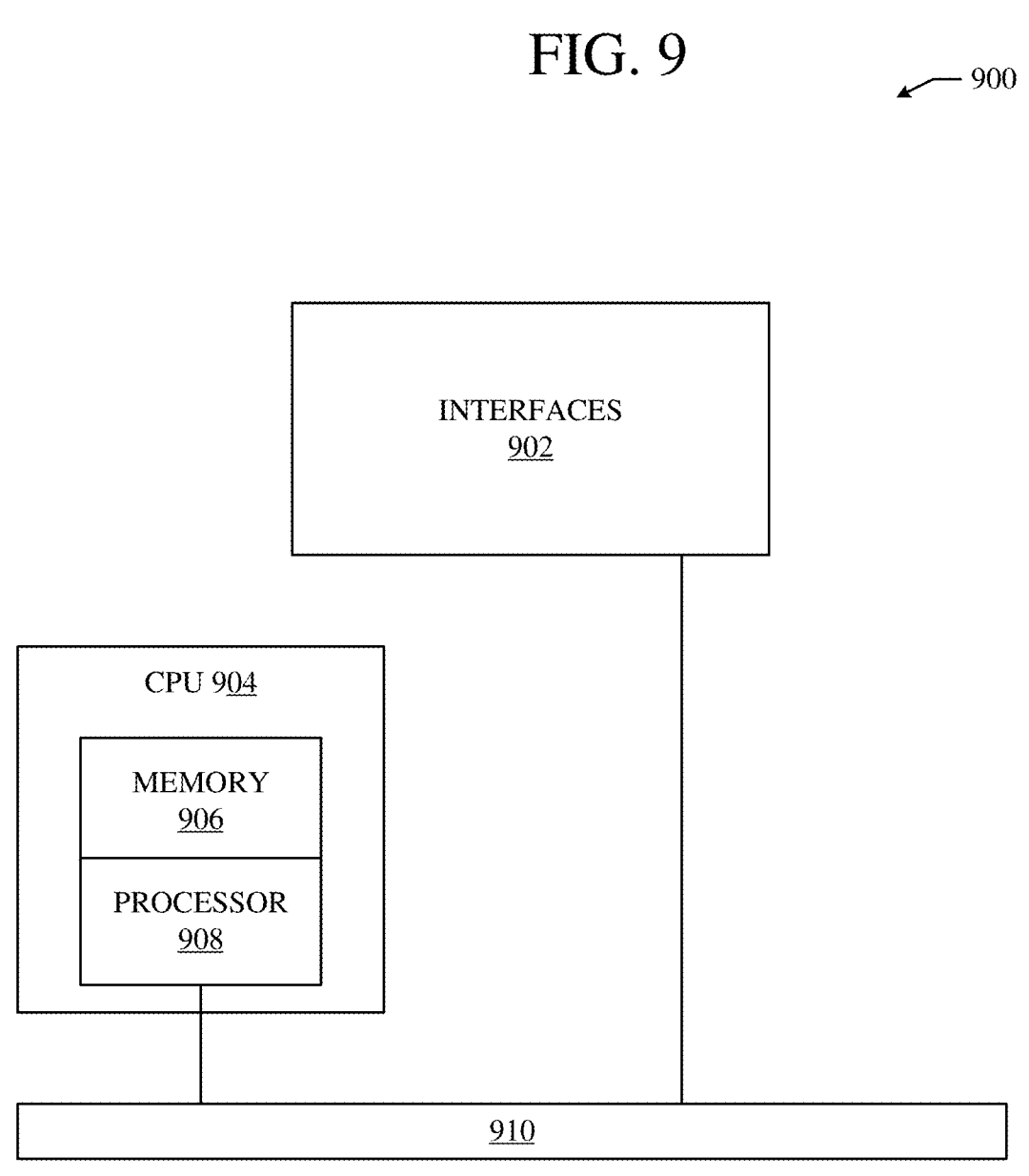
Figure 10:
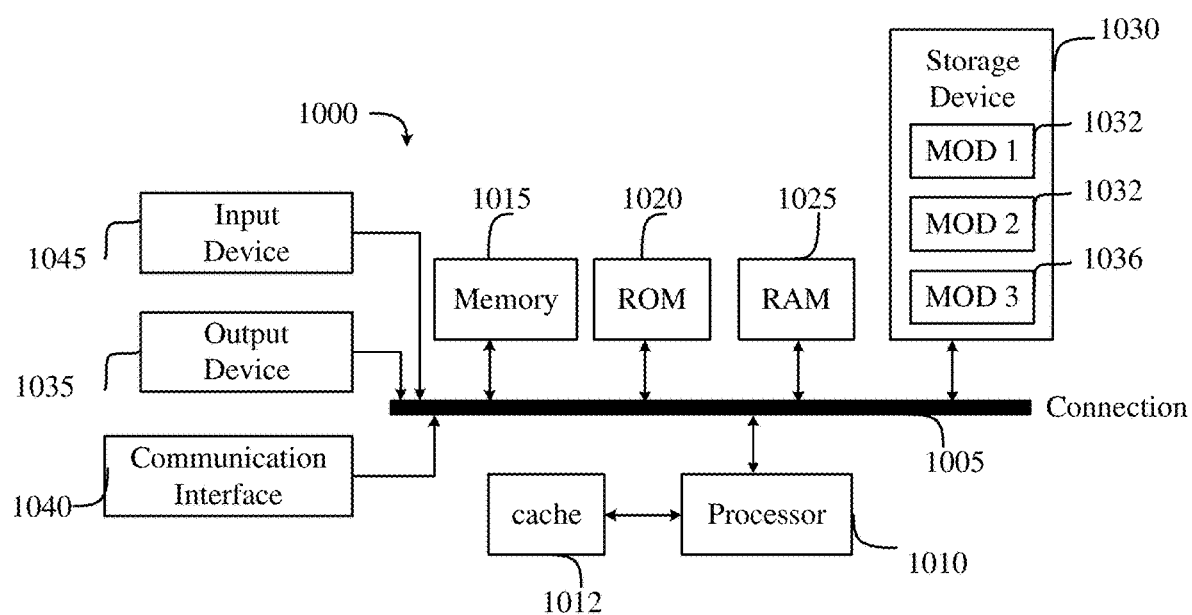
FIG. 10 illustrates an example computing device in accordance with various embodiments.

The disclosed technology addresses the need in the art for providing assurance across a network. The present technology involves system, methods, and computer-readable media for providing cross-domain assurance in a network environment. The present technology will be described in the following disclosure as follows. The discussion begins with an introductory discussion of network assurance and a description of example computing environments, as illustrated in FIGS. 1A and 1B. A discussion of network models for network assurance, as shown in FIGS. 2A through 2D, and network assurance systems and methods, as shown in FIGS. 3A-C, 4 will then follow. A discussion of generating network traffic data for clusters of nodes in a network, as shown in FIG. 5, will then follow. Further, the description will then include a discussion, as shown in FIGS. 6-8, of cross-domain network assurance. The discussion continues with a description and examples of detecting and reporting anomalies in a network environment, as shown in FIGS. 7 and 8. The description concludes with a discussion of an example network device, as illustrated in FIG. 9, and an example computing device, as illustrated in FIG. 10, including example hardware components suitable for hosting software applications and performing computing operations. The disclosure now turns to an introductory discussion of network assurance.

Network assurance is the guarantee or determination that the network is behaving as intended by the network operator and has been configured properly (e.g., the network is doing network and individual network elements (e.g., switches, routers, applications, resources, etc.). However, often times, the configurations, policies, etc., defined by a network operator are incorrect or not accurately reflected in the actual behavior of the network. For example, a network operator specifies a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator implements configuration C but one or more other configurations result in the network behaving in a manner that is inconsistent with the intent reflected by the implementation of configuration C. For example, such a situation can result when configuration C conflicts with other configurations in the network.

The approaches herein can provide network assurance by modeling various aspects of the network and/or performing consistency checks as well as other network assurance checks. The network assurance approaches herein can be implemented in various types of networks, including a private network, such as a local area network (LAN); an enterprise network; a standalone or traditional network, such as a data center network; a network including a physical or underlay layer and a logical or overlay layer, such as a VXLAN or software-defined network (SDN) (e.g., Application Centric Infrastructure (ACI) or VMware NSX networks); etc.

Network models can be constructed for a network and implemented for network assurance. A network model can provide a representation of one or more aspects of a network, including, without limitation the network's policies, configurations, requirements, security, routing, topology, applications, hardware, filters, contracts, access control lists, infrastructure, etc. As will be further explained below, different types of models can be generated for a network.

Such models can be implemented to ensure that the behavior of the network will be consistent (or is consistent) with the intended behavior reflected through specific configurations (e.g., policies, settings, definitions, etc.) implemented by the network operator. Unlike traditional network monitoring, which involves sending and analyzing data packets and observing network behavior, network assurance can be performed through modeling without necessarily ingesting packet data or monitoring traffic or network behavior. This can result in foresight, insight, and hindsight: problems can be prevented before they occur, identified when they occur, and fixed immediately after they occur.

Thus, network assurance can involve modeling properties of the network to deterministically predict the behavior of the network. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The modeling can consume numerous types of smart events which model a large amount of behavioral aspects of the network. Smart events can impact various aspects of the network, such as underlay services, overlay services, tenant connectivity, tenant security, tenant endpoint (EP) mobility, tenant policy, tenant routing, resources, etc.

Having described various aspects of network assurance, the disclosure now turns to a discussion of example network environments for network assurance.

FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a CDN server, an IDS/IPS, a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers.

Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

FIG. 2A illustrates a diagram of an example Management Information Model 200 for an SDN network, such as Network Environment 100. The following discussion of Management Information Model 200 references various terms which shall also be used throughout the disclosure. Accordingly, for clarity, the disclosure shall first provide below a list of terminology, which will be followed by a more detailed discussion of Management Information Model 200.

As used herein, an "Alias" can refer to a changeable name for a given object. Thus, even if the name of an object, once created, cannot be changed, the Alias can be a field that can be changed.

As used herein, the term "Aliasing" can refer to a rule (e.g., contracts, policies, configurations, etc.) that overlaps one or more other rules. For example, Contract 1 defined in a logical model of a network can be said to be aliasing Contract 2 defined in the logical model of the network if Contract 1 overlaps Contract 1. In this example, by aliasing Contract 2, Contract 1 may render Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 116) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BDD" can refer to a binary decision tree. A binary decision tree can be a data structure representing functions, such as Boolean functions.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a L2 (Layer 2) construct.

As used herein, a "Consumer" can refer to an endpoint, resource, and/or EPG that consumes a service.

As used herein, a "Context" can refer to an L3 (Layer 3) address domain that allows multiple instances of a routing table to exist and work simultaneously. This increases functionality by allowing network paths to be segmented without using multiple devices. Non-limiting examples of a context or L3 address domain can include a Virtual Routing and Forwarding (VRF) instance, a private network, and so forth.

As used herein, the term "Contract" can refer to rules or configurations that specify what and how communications in a network are conducted (e.g., allowed, denied, filtered, processed, etc.). In an ACI network, contracts can specify how communications between endpoints and/or EPGs take place. In some examples, a contract can provide rules and configurations akin to an Access Control List (ACL).

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endpoints as previously described with reference to FIG. 1B.

As used herein, the term "Filter" can refer to a parameter or configuration for allowing communications. For example, in a whitelist model where all communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to allow inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 120) and an outside Layer 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects that are managed in a network (e.g., Network Environment 100). The objects can be concrete objects (e.g., a switch, server, adapter, etc.), or logical objects (e.g., an application profile, an EPG, a fault, etc.). The MOs can be network resources or elements that are managed in the network. For example, in an ACI environment, an MO can include an abstraction of an ACI fabric (e.g., Fabric 120) resource.

As used herein, the term "Management Information Tree" (MIT) can refer to a hierarchical management information tree containing the MOs of a system. For example, in ACI, the MIT contains the MOs of the ACI fabric (e.g., Fabric 120). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 120 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive virtual computing environment. In ACI, a tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that allows multiple instances of a routing table to exist and work simultaneously. This increases functionality by allowing network paths to be segmented without using multiple devices. Also known as a context or private network.

Having described various terms used herein, the disclosure now returns to a discussion of Management Information Model (MIM) 200 in FIG. 2A. As previously noted, MIM 200 can be a hierarchical management information tree or MIT. Moreover, MIM 200 can be managed and processed by Controllers 116, such as APICs in an ACI. Controllers 116 can enable the control of managed resources by presenting their manageable characteristics as object properties that can be inherited according to the location of the object within the hierarchical structure of the model.

The hierarchical structure of MIM 200 starts with Policy Universe 202 at the top (Root) and contains parent and child nodes 116, 204, 206, 208, 210, 212. Nodes 116, 202, 204, 206, 208, 210, 212 in the tree represent the managed objects (MOs) or groups of objects. Each object in the fabric (e.g., Fabric 120) has a unique distinguished name (DN) that describes the object and locates its place in the tree. The Nodes 116, 202, 204, 206, 208, 210, 212 can include the various MOs, as described below, which contain policies that govern the operation of the system.

Controllers 116

Controllers 116 (e.g., APIC controllers) can provide management, policy programming, application deployment, and health monitoring for Fabric 120.

Node 204

Node 204 includes a tenant container for policies that enable an administrator to exercise domain-based access control. Non-limiting examples of tenants can include:

User tenants defined by the administrator according to the needs of users. They contain policies that govern the operation of resources such as applications, databases, web servers, network-attached storage, virtual machines, and so on.

The common tenant is provided by the system but can be configured by the administrator. It contains policies that govern the operation of resources accessible to all tenants, such as firewalls, load balancers, Layer 4 to Layer 7 services, intrusion detection appliances, and so on.

The infrastructure tenant is provided by the system but can be configured by the administrator. It contains policies that govern the operation of infrastructure resources such as the fabric overlay (e.g., VXLAN). It also enables a fabric provider to selectively deploy resources to one or more user tenants. Infrastructure tenant polices can be configurable by the administrator.

The management tenant is provided by the system but can be configured by the administrator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with virtual machine controllers.

Node 206

Node 206 can contain access policies that govern the operation of switch access ports that provide connectivity to resources such as storage, compute, Layer 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control Protocol (LACP), or Spanning Tree Protocol (STP), an administrator can configure access policies to enable such configurations on the access ports of Leafs 104.

Node 206 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 208

Node 208 can contain VM domains that group VM controllers with similar networking policy requirements. VM controllers can share virtual space (e.g., VLAN or VXLAN space) and application EPGs. Controllers 116 communicate with the VM controller to publish network configurations such as port groups that are then applied to the virtual workloads.

Node 210

Node 210 can contain Layer 4 to Layer 7 service integration life cycle automation framework that enables the system to dynamically respond when a service comes online or goes offline. Policies can provide service device package and inventory management functions.

Node 212

Node 212 can contain access, authentication, and accounting (AAA) policies that govern user privileges, roles, and security domains of Fabric 120.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 2B:
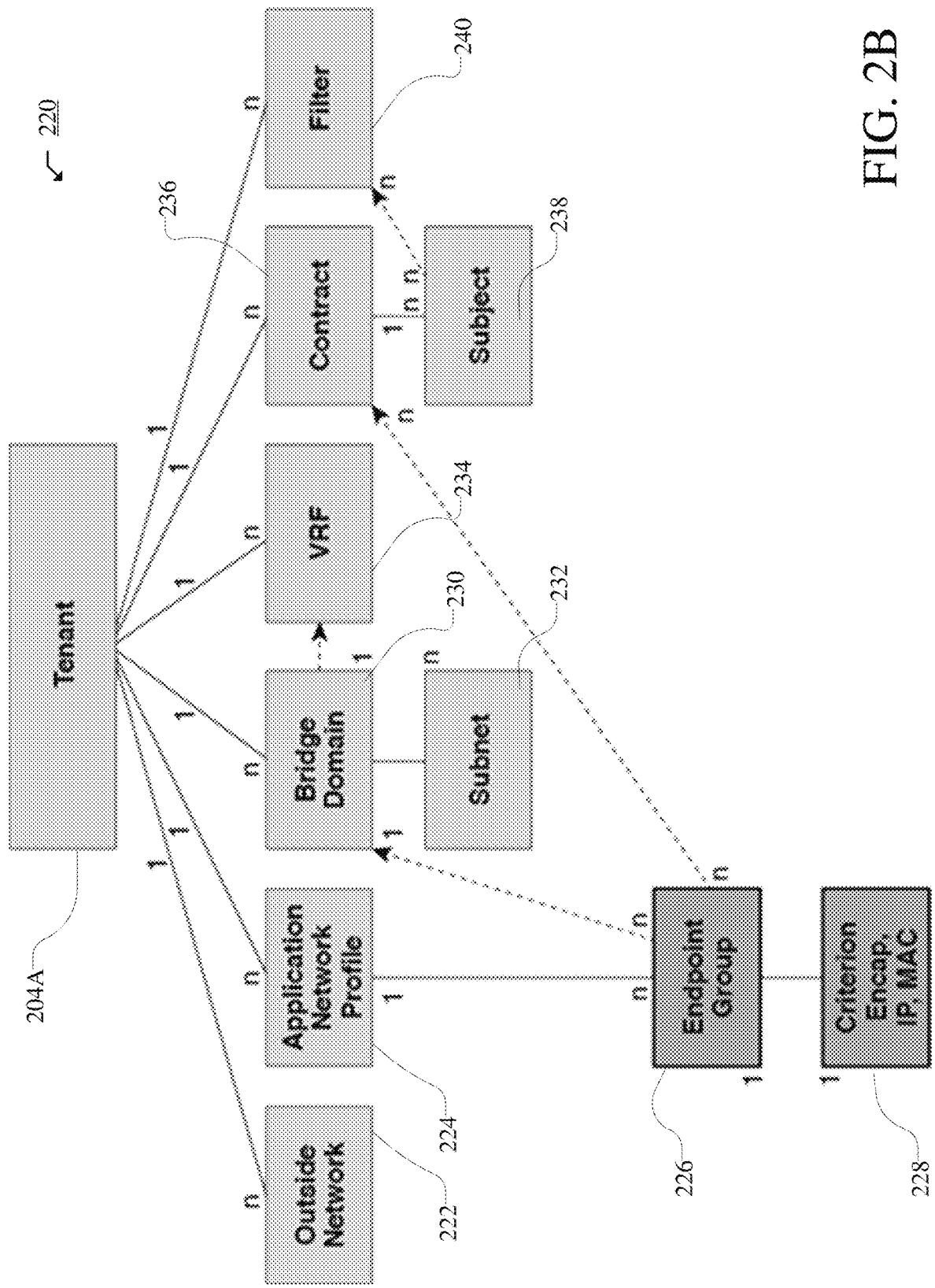
FIG. 2B illustrates an example object model for a tenant object in the example object model from FIG. 2A.

FIG. 2B illustrates an example object model 220 for a tenant portion of MIM 200. As previously noted, a tenant is a logical container for application policies that enable an administrator to exercise domain-based access control. A tenant thus represents a unit of isolation from a policy perspective, but it does not necessarily represent a private network. Tenants can represent a customer in a service provider setting, an organization or domain in an enterprise setting, or just a convenient grouping of policies. Moreover, tenants can be isolated from one another or can share resources.

Tenant portion 204A of MIM 200 can include various entities, and the entities in Tenant Portion 204A can inherit policies from parent entities. Non-limiting examples of entities in Tenant Portion 204A can include Filters 240, Contracts 236, Outside Networks 222, Bridge Domains 230, VRF Instances 234, and Application Profiles 224.

Bridge Domains 230 can include Subnets 232. Contracts 236 can include Subjects 238. Application Profiles 224 can contain one or more EPGs 226. Some applications can contain multiple components. For example, an e-commerce application could require a web server, a database server, data located in a storage area network, and access to outside resources that enable financial transactions. Application Profile 224 contains as many (or as few) EPGs as necessary that are logically related to providing the capabilities of an application.

EPG 226 can be organized in various ways, such as based on the application they provide, the function they provide (such as infrastructure), where they are in the structure of the data center (such as DMZ), or whatever organizing principle that a fabric or tenant administrator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 226 can also contain Attributes 228, such as encapsulation-based EPGs, IP-based EPGs, or MAC-based EPGs.

As previously mentioned, EPGs can contain endpoints (e.g., EPs 122) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an administrator in Controllers 116, or dynamically configured by an automated system such as VCENTER or OPENSTACK.

To activate tenant policies in Tenant Portion 204A, fabric access policies should be configured and associated with tenant policies. Access policies enable an administrator to configure other network configurations, such as port channels and virtual port channels, protocols such as LLDP, CDP, or LACP, and features such as monitoring or diagnostics.

Figure 2C:
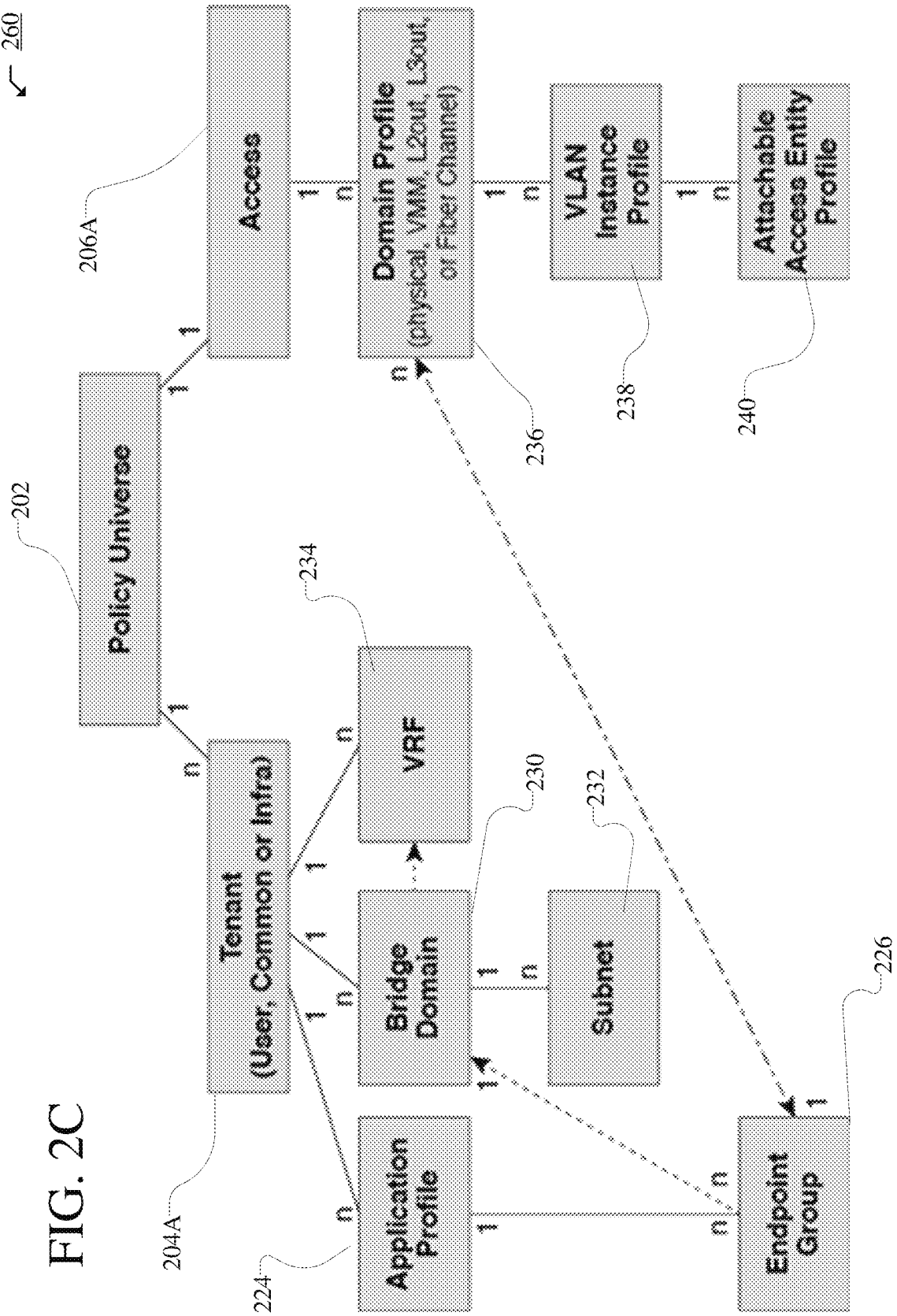
FIG. 2C illustrates an example association of various objects in the example object model from FIG. 2A.

FIG. 2C illustrates an example Association 260 of tenant entities and access entities in MIM 200. Policy Universe 202 contains Tenant Portion 204A and Access Portion 206A. Thus, Tenant Portion 204A and Access Portion 206A are associated through Policy Universe 202.

Access Portion 206A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 206A thus contains Domain Profile 236 which can define a physical, VMM, L2 out, L3 out, or Fiber Channel domain, for example, to be associated to the EPGs. Domain Profile 236 contains VLAN Instance Profile 238 (e.g., VLAN pool) and Attachable Access Entity Profile (AEP) 240, which are associated directly with application EPGs. The AEP 240 deploys the associated application EPGs to the ports to which it is attached, and automates the task of assigning VLANs. While a large data center can have thousands of active VMs provisioned on hundreds of VLANs, Fabric 120 can automatically assign VLAN IDs from VLAN pools. This saves time compared with trunking down VLANs in a traditional data center.

Figure 2D:
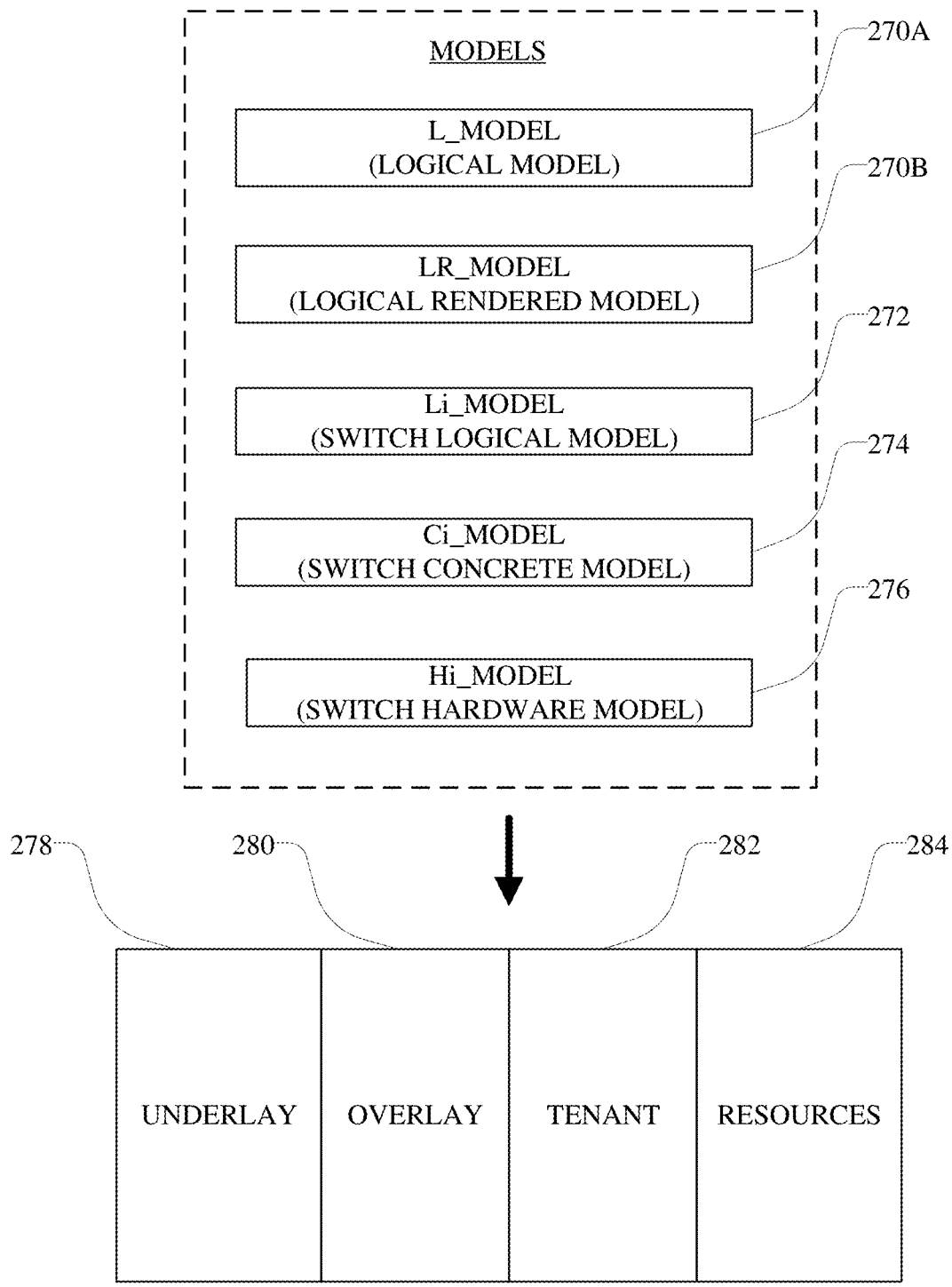
FIG. 2D illustrates a schematic diagram of example models for implementing the example object model from FIG. 2A.

FIG. 2D illustrates a schematic diagram of example models for implementing MIM 200. The network assurance models can include L_Model 270A (Logical Model), LR_Model 270B (Logical Rendered Model or Logical Runtime Model), Li_Model 272 (Logical Model for i), Ci_Model 274 (Concrete model for i), and Hi_Model 276 (Hardware model or TCAM Model for i).

L_Model 270A is the logical representation of the objects and their relationships in MIM 200. L_Model 270A can be generated by Controllers 116 based on configurations entered in Controllers 116 for the network, and thus represents the configurations of the network at Controllers 116. This is the declaration of the "end-state" expression that is desired when the elements of the network entities (e.g., applications) are connected and Fabric 120 is provisioned by Controllers 116. In other words, because L_Model 270A represents the configurations entered in Controllers 116, including the objects and relationships in MIM 200, it can also reflect the "intent" of the administrator: how the administrator wants the network and network elements to behave.

LR_Model 270B is the abstract model expression that Controllers 116 (e.g., APICs in ACI) resolve from L_Model 270A. LR_Model 270B can thus provide the elemental configuration components that would be delivered to the physical infrastructure (e.g., Fabric 120) to execute one or more policies. For example, LR_Model 270B can be delivered to Leafs 104 in Fabric 120 to configure Leafs 104 for communication with attached Endpoints 122.

Li_Model 272 is a switch-level or switch-specific model obtained from Logical Model 270A and/or Resolved Model 270B. For example, Li_Model 272 can represent the portion of L_Model 270A and/or LR_Model 270B pertaining to a specific switch or router i. To illustrate, Li_Model 272 $L_1$ can represent the portion of L_Model 270A and/or LR_Model 270B pertaining to Leaf 1 (104). Thus, Li_Model 272 can be generated from L_Model 270A and/or LR_Model 270B for one or more switch or routers (e.g., Leafs 104 and/or Spines 102) on Fabric 120.

Ci_Model 274 is the actual in-state configuration at the individual fabric member i (e.g., switch i). In other words, Ci_Model 274 is a switch-level or switch-specific model that is based on Li_Model 272. For example, Controllers 116 can deliver Li_Model 272 to Leaf 1 (104). Leaf 1 (104) can take Li_Model 272, which can be specific to Leaf 1 (104), and render the policies in Li_Model 272 into a concrete model, Ci_Model 274, that runs on Leaf 1 (104). Leaf 1 (104) can render Li_Model 272 via the OS on Leaf 1 (104), for example. Thus, Ci_Model 274 can be analogous to compiled software, as it is the form of Li_Model 272 that the switch OS at Leaf 1 (104) can execute.

Hi_Model 276 is also a switch-level or switch-specific model for switch i, but is based on Ci_Model 274 for switch i. Hi_Model 276 is the actual configuration (e.g., rules) stored or rendered on the hardware or memory (e.g., TCAM memory) at the individual fabric member i (e.g., switch i). For example, Hi_Model 276 can represent the configurations (e.g., rules) which Leaf 1 (104) stores or renders on the hardware (e.g., TCAM memory) of Leaf 1 (104) based on Ci_Model 274 at Leaf 1 (104). The switch OS at Leaf 1 (104) can render or execute Ci_Model 274, and Leaf 1 (104) can store or render the configurations from Ci Model in storage, such as the memory or TCAM at Leaf 1 (104). The configurations from Hi_Model 276 stored or rendered by Leaf 1 (104) represent the configurations that will be implemented by Leaf 1 (104) when processing traffic.

While Models 272, 274, 276 are shown as device-specific models, similar models can be generated or aggregated for a collection of fabric members (e.g., Leafs 104 and/or Spines 102) in Fabric 120. When combined, device-specific models, such as Model 272, Model 274, and/or Model 276, can provide a representation of Fabric 120 that extends beyond a particular device. For example, in some cases, Li_Model 272, Ci Model 272, and/or Hi Model 272 associated with some or all individual fabric members (e.g., Leafs 104 and Spines 102) can be combined or aggregated to generate one or more aggregated models based on the individual fabric members.

As referenced herein, the terms H Model, T Model, and TCAM Model can be used interchangeably to refer to a hardware model, such as Hi_Model 276. For example, Ti Model, Hi Model and TCAMi Model may be used interchangeably to refer to Hi_Model 276.

Models 270A, 270B, 272, 274, 276 can provide representations of various aspects of the network or various configuration stages for MIM 200. For example, one or more of Models 270A, 270B, 272, 274, 276 can be used to generate Underlay Model 278 representing one or more aspects of Fabric 120 (e.g., underlay topology, routing, etc.), Overlay Model 280 representing one or more aspects of the overlay or logical segment(s) of Network Environment 100 (e.g., COOP, MPBGP, tenants, VRFs, VLANs, VXLANs, virtual applications, VMs, hypervisors, virtual switching, etc.), Tenant Model 282 representing one or more aspects of Tenant portion 204A in MIM 200 (e.g., security, forwarding, service chaining, QoS, VRFs, BDs, Contracts, Filters, EPGs, subnets, etc.), Resources Model 284 representing one or more resources in Network Environment 100 (e.g., storage, computing, VMs, port channels, physical elements, etc.), etc.

In general, L_Model 270A can be the high-level expression of what exists in the LR_Model 270B, which should be present on the concrete devices as Ci_Model 274 and Hi_Model 276 expression. If there is any gap between the models, there may be inconsistent configurations or problems.

Figure 3A:
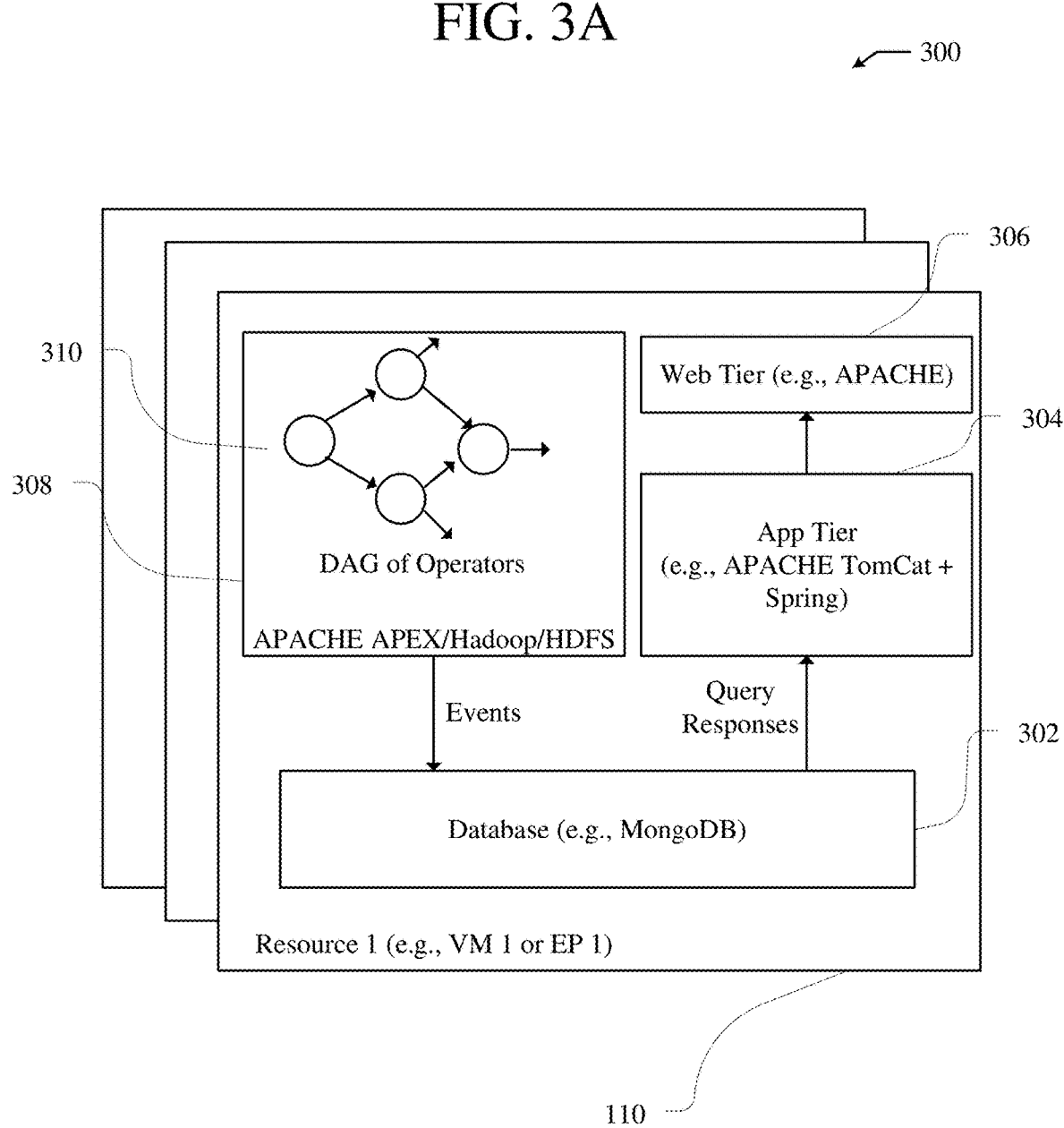
FIG. 3A illustrates an example network assurance appliance.

FIG. 3A illustrates a diagram of an example Assurance Appliance 300 for network assurance. In this example, Assurance Appliance 300 can include k VMs 110 operating in cluster mode. VMs are used in this example for explanation purposes. However, it should be understood that other configurations are also contemplated herein, such as use of containers, bare metal devices, Endpoints 122, or any other physical or logical systems. Moreover, while FIG. 3A illustrates a cluster mode configuration, other configurations are also contemplated herein, such as a single mode configuration (e.g., single VM, container, or server) or a service chain for example.

Assurance Appliance 300 can run on one or more Servers 106, VMs 110, Hypervisors 108, EPs 122, Leafs 104, Controllers 116, or any other system or resource. For example, Assurance Appliance 300 can be a logical service or application running on one or more VMs 110 in Network Environment 100.

The Assurance Appliance 300 can include Data Framework 308, which can be based on, for example, APACHE APEX and HADOOP. In some cases, assurance checks can be written as individual operators that reside in Data Framework 308. This enables a natively horizontal scale-out architecture that can scale to arbitrary number of switches in Fabric 120 (e.g., ACI fabric).

Assurance Appliance 300 can poll Fabric 120 at a configurable periodicity (e.g., an epoch). The analysis workflow can be setup as a DAG (Directed Acyclic Graph) of Operators 310, where data flows from one operator to another and eventually results are generated and persisted to Database 302 for each interval (e.g., each epoch).

The north-tier implements API Server (e.g., APACHE Tomcat and Spring framework) 304 and Web Server 306. A graphical user interface (GUI) interacts via the APIs exposed to the customer. These APIs can also be used by the customer to collect data from Assurance Appliance 300 for further integration into other tools.

Operators 310 in Data Framework 308 (e.g., APEX/ Hadoop) can together support assurance operations. Below are non-limiting examples of assurance operations that can be performed by Assurance Appliance 300 via Operators 310.

Security Policy Adherence

Assurance Appliance 300 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance 300 can check for issues in the specification of the user's intent or intents (e.g., identify contradictory or conflicting policies in L_Model 270A).

TCAM Utilization

TCAM is a scarce resource in the fabric (e.g., Fabric 120). However, Assurance Appliance 300 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance 300 can validate that the fabric (e.g. fabric 120) has no inconsistencies in the Endpoint information registered (e.g., two leafs announcing the same endpoint, duplicate subnets, etc.), among other such checks.

Tenant Routing Checks

Assurance Appliance 300 can validate that BDs, VRFs, subnets (both internal and external), VLANs, contracts, filters, applications, EPGs, etc., are correctly programmed.

Infrastructure Routing

Assurance Appliance 300 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-time Change Analysis

Assurance Appliance 300 can validate rules in the specification of the network (e.g., L_Model 270A) are complete and do not have inconsistencies or other problems. MOs in the MIM 200 can be checked by Assurance Appliance 300 through syntactic and semantic checks performed on L_Model 270A and/or the associated configurations of the MOs in MIM 200. Assurance Appliance 300 can also verify that unnecessary, stale, unused or redundant configurations, such as contracts, are removed.

Figure 3B:
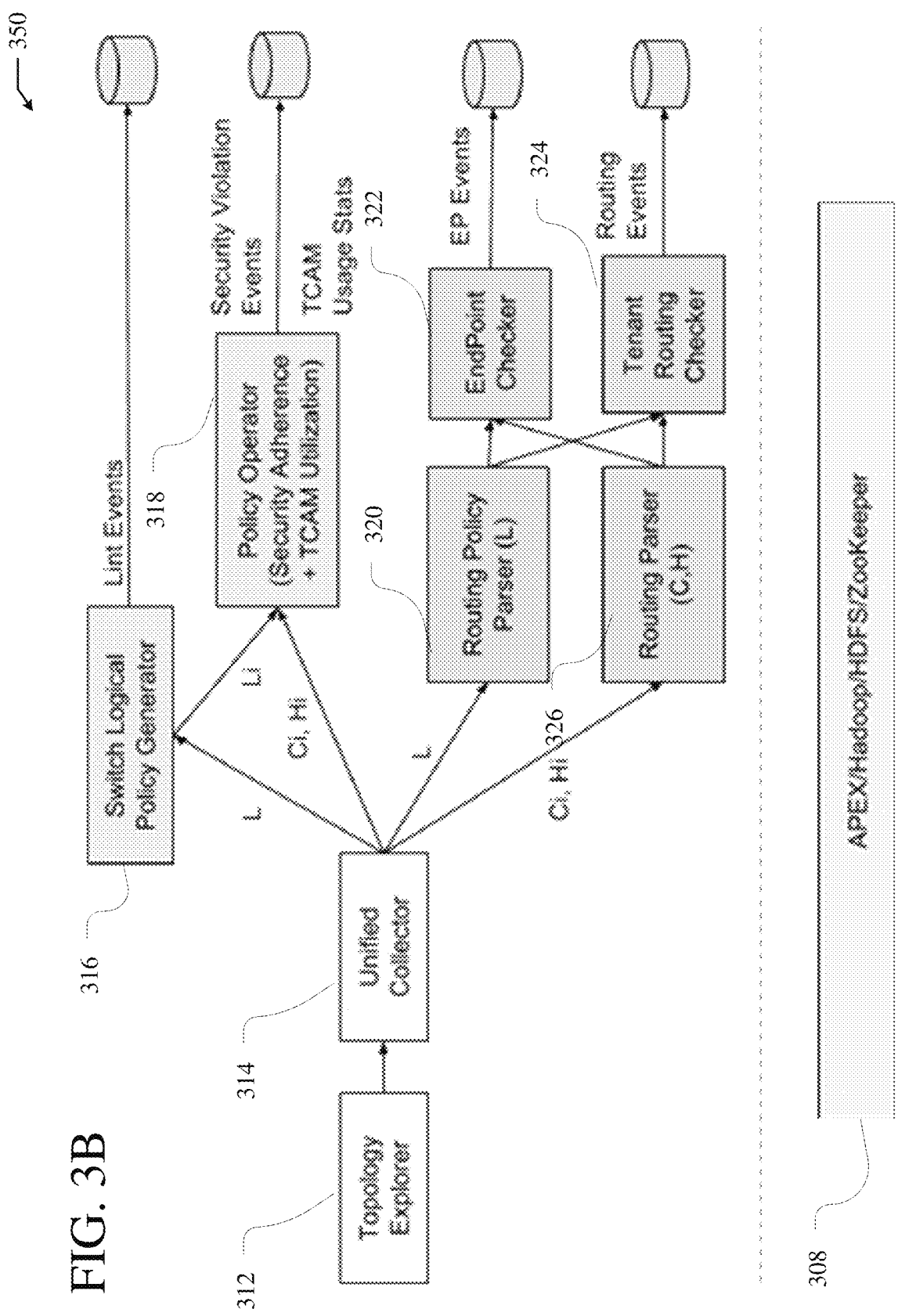
FIG. 3B illustrates an example system for network assurance.

FIG. 3B illustrates an architectural diagram of an example system 350 for network assurance. In some cases, system 350 can correspond to the DAG of Operators 310 previously discussed with respect to FIG. 3A In this example, Topology Explorer 312 communicates with Controllers 116 (e.g., APIC controllers) in order to discover or otherwise construct a comprehensive topological view of Fabric 120 (e.g., Spines 102, Leafs 104, Controllers 116, Endpoints 122, and any other components as well as their interconnections). While various architectural components are represented in a singular, boxed fashion, it is understood that a given architectural component, such as Topology Explorer 312, can correspond to one or more individual Operators 310 and may include one or more nodes or endpoints, such as one or more servers, VMs, containers, applications, service functions (e.g., functions in a service chain or virtualized network function), etc.

Topology Explorer 312 is configured to discover nodes in Fabric 120, such as Controllers 116, Leafs 104, Spines 102, etc. Topology Explorer 312 can additionally detect a majority election performed amongst Controllers 116, and determine whether a quorum exists amongst Controllers 116. If no quorum or majority exists, Topology Explorer 312 can trigger an event and alert a user that a configuration or other error exists amongst Controllers 116 that is preventing a quorum or majority from being reached. Topology Explorer 312 can detect Leafs 104 and Spines 102 that are part of Fabric 120 and publish their corresponding out-of-band management network addresses (e.g., IP addresses) to downstream services. This can be part of the topological view that is published to the downstream services at the conclusion of Topology Explorer's 312 discovery epoch (e.g., 5 minutes, or some other specified interval).

Unified Collector 314 can receive the topological view from Topology Explorer 312 and use the topology information to collect information for network assurance from Fabric 120. Such information can include L_Model 270A and/or LR_Model 270B from Controllers 116, switch software configurations (e.g., Ci_Model 274) from Leafs 104 and/or Spines 102, hardware configurations (e.g., Hi_Model 276) from Leafs 104 and/or Spines 102, etc. Unified Collector 314 can collect Ci_Model 274 and Hi_Model 276 from individual fabric members (e.g., Leafs 104 and Spines 102).

Unified Collector 314 can poll the devices that Topology Explorer 312 discovers in order to collect data from Fabric 120 (e.g., from the constituent members of the fabric). Unified Collector 314 can collect the data using interfaces exposed by Controller 116 and/or switch software (e.g., switch OS), including, for example, a Representation State Transfer (REST) Interface and a Secure Shell (SSH) Interface.

In some cases, Unified Collector 314 collects L_Model 270A, LR_Model 270B, and/or Ci_Model 274 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH_LC shell for accessing runtime state of the line card.

Unified Collector 314 can poll other information from Controllers 116, including: topology information, tenant forwarding/routing information, tenant security policies, contracts, interface policies, physical domain or VMM domain information, OOB (out-of-band) management IP's of nodes in the fabric, etc.

Unified Collector 314 can also poll other information from Leafs 104 and Spines 102, such as: Ci Models 274 for VLANs, BDs, security policies, Link Layer Discovery Protocol (LLDP) connectivity information of Leafs 104 and/or Spines 102, endpoint information from EPM/COOP, fabric card information from Spines 102, routing information base (RIB) tables, forwarding information base (FIB) tables from Leafs 104 and/or Spines 102, security group hardware tables (e.g., TCAM tables) from switches, etc.

Assurance Appliance 300 can run one or more instances of Unified Collector 314. For example, Assurance Appliance 300 can run one, two, three, or more instances of Unified Collector 314. The task of data collecting for each node in the topology (e.g., Fabric 120 including Spines 102, Leafs 104, Controllers 116, etc.) can be sharded or load balanced, to a unique instance of Unified Collector 314. Data collection across the nodes can thus be performed in parallel by one or more instances of Unified Collector 314. Within a given node, commands and data collection can be executed serially. Assurance Appliance 300 can control the number of threads used by each instance of Unified Collector 314 to poll data from Fabric 120.

Data collected by Unified Collector 314 can be compressed and sent to downstream services. In some examples, Unified Collector 314 can collect data in an online fashion or real-time fashion, and send the data downstream, as it is collected, for further analysis. In some examples, Unified Collector 314 can collect data in an offline fashion, and compile the data for later analysis or transmission.

Assurance Appliance 300 can contact Controllers 116, Spines 102, Leafs 104, and other nodes to collect various types of data. In some scenarios, Assurance Appliance 300 may experience a failure (e.g., connectivity problem, hardware or software error, etc.) that prevents it from being able to collect data for a period of time. Assurance Appliance 300 can handle such failures seamlessly, and generate events based on such failures.

Switch Logical Policy Generator 316 can receive L_Model 270A and/or LR_Model 270B from Unified Collector 314 and calculate Li_Model 272 for each network device i (e.g., switch i) in Fabric 120. For example, Switch Logical Policy Generator 316 can receive L_Model 270A and/or LR_Model 270B and generate Li_Model 272 by projecting a logical model for each individual node i (e.g., Spines 102 and/or Leafs 104) in Fabric 120. Switch Logical Policy Generator 316 can generate Li_Model 272 for each switch in Fabric 120, thus creating a switch logical model based on L_Model 270A for each switch.

Switch Logical Configuration Generator 316 can also perform change analysis and generate lint events or records for problems discovered in L_Model 270A and/or LR_Model 270B. The lint events or records can be used to generate alerts for a user or network operator.

Policy Operator 318 can receive Ci_Model 274 and Hi_Model 276 for each switch from Unified Collector 314, and Li_Model 272 for each switch from Switch Logical Policy Generator 316, and perform assurance checks and analysis (e.g., security adherence checks, TCAM utilization analysis, etc.) based on Ci_Model 274, Hi_Model 276, and Li_Model 272. Policy Operator 318 can perform assurance checks on a switch-by-switch basis by comparing one or more of the models.

Returning to Unified Collector 314, Unified Collector 314 can also send L_Model 270A and/or LR_Model 270B to Routing Policy Parser 320, and Ci_Model 274 and Hi_Model 276 to Routing Parser 326.

Routing Policy Parser 320 can receive L_Model 270A and/or LR_Model 270B and parse the model(s) for information that may be relevant to downstream operators, such as Endpoint Checker 322 and Tenant Routing Checker 324. Similarly, Routing Parser 326 can receive Ci_Model 274 and Hi_Model 276 and parse each model for information for downstream operators, Endpoint Checker 322 and Tenant Routing Checker 324.

After Ci_Model 274, Hi_Model 276, L_Model 270A and/or LR_Model 270B are parsed, Routing Policy Parser 320 and/or Routing Parser 326 can send cleaned-up protocol buffers (Proto Buffs) to the downstream operators, Endpoint Checker 322 and Tenant Routing Checker 324. Endpoint Checker 322 can then generate events related to Endpoint violations, such as duplicate IPs, APIPA, etc., and Tenant Routing Checker 324 can generate events related to the deployment of BDs, VRFs, subnets, routing table prefixes, etc.

Figure 3C:
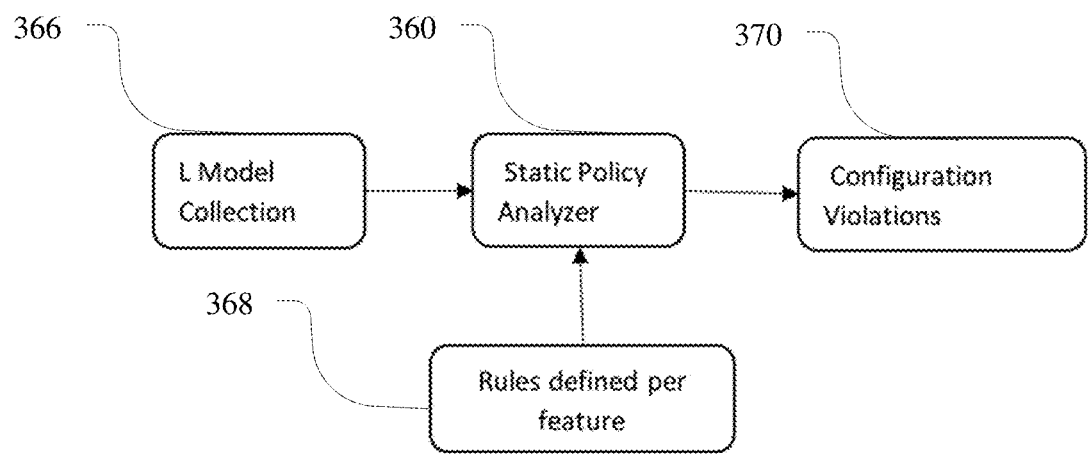
FIG. 3C illustrates a schematic diagram of an example system for static policy analysis in a network.

FIG. 3C illustrates a schematic diagram of an example system for static policy analysis in a network (e.g., Network Environment 100). Static Policy Analyzer 360 can perform assurance checks to detect configuration violations, logical lint events, contradictory or conflicting policies, unused contracts, incomplete configurations, etc. Static Policy Analyzer 360 can check the specification of the user's intent or intents in L_Model 270A to determine if any configurations in Controllers 116 are inconsistent with the specification of the user's intent or intents.

Static Policy Analyzer 360 can include one or more of the Operators 310 executed or hosted in Assurance Appliance 300. However, in other configurations, Static Policy Analyzer 360 can run one or more operators or engines that are separate from Operators 310 and/or Assurance Appliance 300. For example, Static Policy Analyzer 360 can be a VM, a cluster of VMs, or a collection of endpoints in a service function chain.

Static Policy Analyzer 360 can receive as input L_Model 270A from Logical Model Collection Process 366 and Rules 368 defined for each feature (e.g., object) in L_Model 270A. Rules 368 can be based on objects, relationships, definitions, configurations, and any other features in MIM 200. Rules 368 can specify conditions, relationships, parameters, and/or any other information for identifying configuration violations or issues.

Moreover, Rules 368 can include information for identifying syntactic violations or issues. For example, Rules 368 can include one or more rules for performing syntactic checks. Syntactic checks can verify that the configuration of L_Model 270A is complete, and can help identify configurations or rules that are not being used. Syntactic checks can also verify that the configurations in the hierarchical MIM 200 are complete (have been defined) and identify any configurations that are defined but not used. To illustrate, Rules 368 can specify that every tenant in L_Model 270A should have a context configured; every contract in L_Model 270A should specify a provider EPG and a consumer EPG; every contract in L_Model 270A should specify a subject, filter, and/or port; etc.

Rules 368 can also include rules for performing semantic checks and identifying semantic violations or issues. Semantic checks can check conflicting rules or configurations. For example, Rule1 and Rule2 can have aliasing issues, Rule1 can be more specific than Rule2 and thereby create conflicts/ issues, etc. Rules 368 can define conditions which may result in aliased rules, conflicting rules, etc. To illustrate, Rules 368 can specify that an allow policy for a specific communication between two objects can conflict with a deny policy for the same communication between two objects if they allow policy has a higher priority than the deny policy, or a rule for an object renders another rule unnecessary.

Static Policy Analyzer 360 can apply Rules 368 to L_Model 270A to check configurations in L_Model 270A and output Configuration Violation Events 370 (e.g., alerts, logs, notifications, etc.) based on any issues detected. Configuration Violation Events 370 can include semantic or semantic problems, such as incomplete configurations, conflicting configurations, aliased rules, unused configurations, errors, policy violations, misconfigured objects, incomplete configurations, incorrect contract scopes, improper object relationships, etc.

In some cases, Static Policy Analyzer 360 can iteratively traverse each node in a tree generated based on L_Model 270A and/or MIM 200, and apply Rules 368 at each node in the tree to determine if any nodes yield a violation (e.g., incomplete configuration, improper configuration, unused configuration, etc.). Static Policy Analyzer 360 can output Configuration Violation Events 370 when it detects any violations.

FIG. 4 illustrates a flowchart for an example network assurance method. The method shown in FIG. 4 is provided by way of example, as there are a variety of ways to carry out the method. Additionally, while the example method is illustrated with a particular order of blocks, those of ordinary skill in the art will appreciate that FIG. 4 and the blocks shown therein can be executed in any order and can include fewer or more blocks than illustrated.

Each block shown in FIG. 4 represents one or more steps, processes, methods or routines in the method. For the sake of clarity and explanation purposes, the blocks in FIG. 4 are described with reference to Assurance Appliance 300, Models 270A-B, 272, 274, 276, and Network Environment 100, as shown in FIGS. 1A-B, 2D, and 3A.

At step 400, Assurance Appliance 300 can collect data and obtain models associated with Network Environment 100. The models can include Models 270A-B, 272, 274, 276. The data can include fabric data (e.g., topology, switch, interface policies, application policies, EPGs, etc.), network configurations (e.g., BDs, VRFs, L2 Outs, L3 Outs, protocol configurations, etc.), security configurations (e.g., contracts, filters, etc.), service chaining configurations, routing configurations, and so forth. Other information collected or obtained can include, for example, network data (e.g., RIB/FIB, VLAN, MAC, ISIS, DB, BGP, OSPF, ARP, VPC, LLDP, MTU, QoS, etc.), rules and tables (e.g., TCAM rules, ECMP tables, etc.), endpoint dynamics (e.g., EPM, COOP EP DB, etc.), statistics (e.g., TCAM rule hits, interface counters, bandwidth, etc.).

At step 402, Assurance Appliance 300 can analyze and model the received data and models. For example, Assurance Appliance 300 can perform formal modeling and analysis, which can involve determining equivalency between models, including configurations, policies, etc.

At step 404, Assurance Appliance 300 can generate one or more smart events. Assurance Appliance 300 can generate smart events using deep object hierarchy for detailed analysis, such as Tenants, switches, VRFs, rules, filters, routes, prefixes, ports, contracts, subjects, etc.

At step 406, Assurance Appliance 300 can visualize the smart events, analysis and/or models. Assurance Appliance 300 can display problems and alerts for analysis and debugging, in a user-friendly GUI.

Sensors implemented in networks are traditionally limited to collecting packet data at networking devices. In some embodiments, networks can be configured with sensors at multiple points, including on networking devices (e.g., switches, routers, gateways, firewalls, deep packet inspectors, traffic monitors, load balancers, etc.), physical servers, hypervisors or shared kernels, virtual partitions (e.g., VMs or containers), and other network elements. This can provide a more comprehensive view of the network. Further, network traffic data (e.g., flows) can be associated with, or otherwise include, host and/or endpoint data (e.g., host/endpoint name, operating system, CPU usage, network usage, disk space, logged users, scheduled jobs, open files, information regarding files stored on a host/endpoint, etc.), process data (e.g., process name, ID, parent process ID, path, CPU utilization, memory utilization, etc.), user data (e.g., user name, ID, login time, etc.), and other collectible data to provide more insight into network activity.

Sensors implemented in a network at multiple points can be used to collect data for nodes grouped together into a cluster. Nodes can be clustered together, or otherwise a cluster of nodes can be identified, using one or a combination of applicable network operation factors. For example, endpoints performing similar workloads, communicating with a similar set of endpoints or networking devices, having similar network and security limitations (i.e., policies), and sharing other attributes can be clustered together.

In some embodiments, a cluster can be determined based on early fusion in which feature vectors of each node comprise the union of individual feature vectors across multiple domains. For example, a feature vector can include a packet header-based feature (e.g., destination network address for a flow, port, etc.) concatenated to an aggregate flow-based feature (e.g., the number of packets in the flow, the number of bytes in the flow, etc.). A cluster can then be defined as a set of nodes whose respective concatenated feature vectors are determined to exceed specified similarity thresholds (or fall below specified distance thresholds).

In some embodiments, a cluster can be defined based on late fusion in which each node can be represented as multiple feature vectors of different data types or domains. In such systems, a cluster can be a set of nodes whose similarity (and/or distance measures) across different domains, satisfy specified similarity (and/or distance) conditions for each domain. For example, a first node can be defined by a first network information-based feature vector and a first process-based feature vector while a second node can be defined by a second network information-based feature vector and a second process-based feature vector. The nodes can be determined to form a cluster if their corresponding network-based feature vectors are similar to a specified degree and their corresponding process-based feature vectors are only a specified distance apart.

FIG. 5 is an illustration of a network traffic monitoring system 500 in accordance with an embodiment. The network traffic monitoring system 500 can include a configuration manager 502, sensors 504, a collector module 506, a data mover module 508, an analytics engine 510, and a presentation module 512. In FIG. 5, the analytics engine 510 is also shown in communication with out-of-band data sources 514, third party data sources 516, and a network controller 518.

The configuration manager 502 can be used to provision and maintain the sensors 504, including installing sensor software or firmware in various nodes of a network, configuring the sensors 504, updating the sensor software or firmware, among other sensor management tasks. For example, the sensors 504 can be implemented as virtual partition images (e.g., virtual machine (VM) images or container images), and the configuration manager 502 can distribute the images to host machines. In general, a virtual partition can be an instance of a VM, container, sandbox, or other isolated software environment. The software environment can include an operating system and application software. For software running within a virtual partition, the virtual partition can appear to be, for example, one of many servers or one of many operating systems executed on a single physical server. The configuration manager 502 can instantiate a new virtual partition or migrate an existing partition to a different physical server. The configuration manager 502 can also be used to configure the new or migrated sensor.

The configuration manager 502 can monitor the health of the sensors 504. For example, the configuration manager 502 can request for status updates and/or receive heartbeat messages, initiate performance tests, generate health checks, and perform other health monitoring tasks. In some embodiments, the configuration manager 502 can also authenticate the sensors 504. For instance, the sensors 504 can be assigned a unique identifier, such as by using a one-way hash function of a sensor's basic input/out system (BIOS) universally unique identifier (UUID) and a secret key stored by the configuration image manager 502. The UUID can be a large number that can be difficult for a malicious sensor or other device or component to guess. In some embodiments, the configuration manager 502 can keep the sensors 504 up to date by installing the latest versions of sensor software and/or applying patches. The configuration manager 502 can obtain these updates automatically from a local source or the Internet.

The sensors 504 can reside on various nodes of a network, such as a virtual partition (e.g., VM or container) 520; a hypervisor or shared kernel managing one or more virtual partitions and/or physical servers 522, an application-specific integrated circuit (ASIC) 524 of a switch, router, gateway, or other networking device, or a packet capture (pcap) 526 appliance (e.g., a standalone packet monitor, a device connected to a network devices monitoring port, a device connected in series along a main trunk of a datacenter, or similar device), or other element of a network. The sensors 504 can monitor network traffic between nodes, and send network traffic data and corresponding data (e.g., host data, process data, user data, etc.) to the collectors 508 for storage. For example, the sensors 504 can sniff packets being sent over its hosts' physical or virtual network interface card (NIC), or individual processes can be configured to report network traffic and corresponding data to the sensors 504. Incorporating the sensors 504 on multiple nodes and within multiple partitions of some nodes of the network can provide for robust capture of network traffic and corresponding data from each hop of data transmission. In some embodiments, each node of the network (e.g., VM, container, or other virtual partition 520, hypervisor, shared kernel, or physical server 522, ASIC 524, pcap 526, etc.) includes a respective sensor 504. However, it should be understood that various software and hardware configurations can be used to implement the sensor network 504.

As the sensors 504 capture communications and corresponding data, they can continuously send network traffic data to the collectors 508. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 504 can also determine additional data, included as part of gathered network traffic data, for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 504 can perform some preprocessing of the network traffic and corresponding data before sending the data to the collectors 508. For example, the sensors 504 can remove extraneous or duplicative data or they can create summaries of the data (e.g., latency, number of packets per flow, number of bytes per flow, number of flows, etc.). In some embodiments, the sensors 504 can be configured to only capture certain types of network information and disregard the rest. In some embodiments, the sensors 504 can be configured to capture only a representative sample of packets (e.g., every 1,000th packet or other suitable sample rate) and corresponding data.

Since the sensors 504 can be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which can be used as additional data points by the analytics engine 510. Further, collecting network traffic and corresponding data from multiple points of view ensures more accurate data is captured. For example, a conventional sensor network can be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors cannot be accurately monitored by the conventional sensor network. The sensor network 504 of various embodiments substantially mitigates or eliminates these issues altogether by locating sensors at multiple points of potential failure. Moreover, the network traffic monitoring system 500 can verify multiple instances of data for a flow (e.g., source endpoint flow data, network device flow data, and endpoint flow data) against one another.

In some embodiments, the network traffic monitoring system 500 can assess a degree of accuracy of flow data sets from multiple sensors and utilize a flow data set from a single sensor determined to be the most accurate and/or complete. The degree of accuracy can be based on factors such as network topology (e.g., a sensor closer to the source can be more likely to be more accurate than a sensor closer to the destination), a state of a sensor or a node hosting the sensor (e.g., a compromised sensor/node can have less accurate flow data than an uncompromised sensor/node), or flow data volume (e.g., a sensor capturing a greater number of packets for a flow can be more accurate than a sensor capturing a smaller number of packets).

In some embodiments, the network traffic monitoring system 500 can assemble the most accurate flow data set and corresponding data from multiple sensors. For instance, a first sensor along a data path can capture data for a first packet of a flow but can be missing data for a second packet of the flow while the situation is reversed for a second sensor along the data path. The network traffic monitoring system 500 can assemble data for the flow from the first packet captured by the first sensor and the second packet captured by the second sensor.

As discussed, the sensors 504 can send network traffic and corresponding data to the collectors 506. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 504 are not assigned specific collectors but the network traffic monitoring system 500 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it can be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 506 can be any type of storage medium that can serve as a repository for the network traffic and corresponding data captured by the sensors 504. In some embodiments, data storage for the collectors 506 is located in an in-memory database, such as dashDB from IBM®, although it should be appreciated that the data storage for the collectors 506 can be any software and/or hardware capable of providing rapid random access speeds typically used for analytics software. In various embodiments, the collectors 506 can utilize solid state drives, disk drives, magnetic tape drives, or a combination of the foregoing according to cost, responsiveness, and size requirements. Further, the collectors 506 can utilize various database structures such as a normalized relational database or a NoSQL database, among others.

In some embodiments, the collectors 506 can only serve as network storage for the network traffic monitoring system 500. In such embodiments, the network traffic monitoring system 500 can include a data mover module 508 for retrieving data from the collectors 506 and making the data available to network clients, such as the components of the analytics engine 510. In effect, the data mover module 508 can serve as a gateway for presenting network-attached storage to the network clients. In other embodiments, the collectors 506 can perform additional functions, such as organizing, summarizing, and preprocessing data. For example, the collectors 106 can tabulate how often packets of certain sizes or types are transmitted from different nodes of the network. The collectors 506 can also characterize the traffic flows going to and from various nodes. In some embodiments, the collectors 506 can match packets based on sequence numbers, thus identifying traffic flows and connection links. As it can be inefficient to retain all data indefinitely in certain circumstances, in some embodiments, the collectors 506 can periodically replace detailed network traffic data with consolidated summaries. In this manner, the collectors 506 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set can be retained for a lengthier period of time for another set of flows identified as anomalous or as an attack.

The analytics engine 510 can generate analytics using data collected by the sensors 504. Analytics generated by the analytics engine 510 can include applicable analytics of nodes or a cluster of nodes operating in a network. For example, analytics generated by the analytics engine 510 can include one or a combination of information related to flows of data through nodes, detected attacks on a network or nodes of a network, applications at nodes or distributed across the nodes, application dependency mappings for applications at nodes, policies implemented at nodes, and actual policies enforced at nodes.

Computer networks can be exposed to a variety of different attacks that expose vulnerabilities of computer systems in order to compromise their security. Some network traffic can be associated with malicious programs or devices. The analytics engine 510 can be provided with examples of network states corresponding to an attack and network states corresponding to normal operation. The analytics engine 510 can then analyze network traffic and corresponding data to recognize when the network is under attack. In some embodiments, the network can operate within a trusted environment for a period of time so that the analytics engine 510 can establish a baseline of normal operation. Since malware is constantly evolving and changing, machine learning can be used to dynamically update models for identifying malicious traffic patterns.

In some embodiments, the analytics engine 510 can be used to identify observations which differ from other examples in a dataset. For example, if a training set of example data with known outlier labels exists, supervised anomaly detection techniques can be used. Supervised anomaly detection techniques utilize data sets that have been labeled as normal and abnormal and train a classifier. In a case in which it is unknown whether examples in the training data are outliers, unsupervised anomaly techniques can be used. Unsupervised anomaly detection techniques can be used to detect anomalies in an unlabeled test data set under the assumption that the majority of instances in the data set are normal by looking for instances that seem to fit to the remainder of the data set.

The analytics engine 510 can include a data lake 530, an application dependency mapping (ADM) module 540, and elastic processing engines 550. The data lake 530 is a large-scale storage repository that provides massive storage for various types of data, enormous processing power, and the ability to handle nearly limitless concurrent tasks or jobs. In some embodiments, the data lake 530 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 508 receives raw network traffic and corresponding data from the collectors 506 and distributes or pushes the data to the data lake 530. The data lake 530 can also receive and store out-of-band data 514, such as statuses on power levels, network availability, server performance, temperature conditions, cage door positions, and other data from internal sources, and third party data 516, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 530 can instead fetch or pull raw traffic and corresponding data from the collectors 506 and relevant data from the out-of-band data sources 514 and the third party data sources 516. In yet other embodiments, the functionality of the collectors 506, the data mover 508, the out-of-band data sources 514, the third party data sources 516, and the data lake 530 can be combined. Various combinations and configurations are possible as would be known to one of ordinary skill in the art.

Each component of the data lake 530 can perform certain processing of the raw network traffic data and/or other data (e.g., host data, process data, user data, out-of-band data or third party data) to transform the raw data to a form useable by the elastic processing engines 550. In some embodiments, the data lake 530 can include repositories for flow attributes 532, host and/or endpoint attributes 534, process attributes 536, and policy attributes 538. In some embodiments, the data lake 530 can also include repositories for VM or container attributes, application attributes, tenant attributes, network topology, application dependency maps, cluster attributes, etc.

The flow attributes 532 relate to information about flows traversing the network. A flow is generally one or more packets sharing certain attributes that are sent within a network within a specified period of time. The flow attributes 532 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address can correspond to a first endpoint (e.g., network device, physical server, virtual partition, etc.) of the network, and the destination address can correspond to a second endpoint, a multicast group, or a broadcast domain. The flow attributes 532 can also include aggregate packet data such as flow start time, flow end time, number of packets for a flow, number of bytes for a flow, the union of TCP flags for a flow, among other flow data.

The host and/or endpoint attributes 534 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 534 can also include the out-of-band data 514 regarding hosts such as power level, temperature, and physical location (e.g., room, row, rack, cage door position, etc.) or the third party data 516 such as whether a host and/or endpoint is on an IP watch list or otherwise associated with a security threat, Whois data, or geocoordinates. In some embodiments, the out-of-band data 514 and the third party data 516 can be associated by process, user, flow, or other more granular or less granular network element or network communication.

The process attributes 536 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 538 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 538 can include policy statistics such as a number of times a policy was enforced or a number of times a policy was not enforced. The policy attributes 538 can also include associations with network traffic data. For example, flows found to be non-conformant can be linked or tagged with corresponding policies to assist in the investigation of non-conformance.

The analytics engine 510 can include any number of engines 550, including for example, a flow engine 552 for identifying flows (e.g., flow engine 552) or an attacks engine 554 for identify attacks to the network. In some embodiments, the analytics engine can include a separate distributed denial of service (DDoS) attack engine 555 for specifically detecting DDoS attacks. In other embodiments, a DDoS attack engine can be a component or a sub-engine of a general attacks engine. In some embodiments, the attacks engine 554 and/or the DDoS engine 555 can use machine learning techniques to identify security threats to a network. For example, the attacks engine 554 and/or the DDoS engine 555 can be provided with examples of network states corresponding to an attack and network states corresponding to normal operation. The attacks engine 554 and/or the DDoS engine 555 can then analyze network traffic data to recognize when the network is under attack. In some embodiments, the network can operate within a trusted environment for a time to establish a baseline for normal network operation for the attacks engine 554 and/or the DDoS.

The analytics engine 510 can further include a search engine 556. The search engine 556 can be configured, for example to perform a structured search, an NLP (Natural Language Processing) search, or a visual search. Data can be provided to the engines from one or more processing components.

The analytics engine 510 can also include a policy engine 558 that manages network policy, including creating and/or importing policies, monitoring policy conformance and non-conformance, enforcing policy, simulating changes to policy or network elements affecting policy, among other policy-related tasks.

The ADM module 540 can determine dependencies of applications of the network. That is, particular patterns of traffic can correspond to an application, and the interconnectivity or dependencies of the application can be mapped to generate a graph for the application (i.e., an application dependency mapping). In this context, an application refers to a set of networking components that provides connectivity for a given set of workloads. For example, in a conventional three-tier architecture for a web application, first endpoints of the web tier, second endpoints of the application tier, and third endpoints of the data tier make up the web application. The ADM module 540 can receive input data from various repositories of the data lake 530 (e.g., the flow attributes 532, the host and/or endpoint attributes 534, the process attributes 536, etc.). The ADM module 540 can analyze the input data to determine that there is first traffic flowing between external endpoints on port 80 of the first endpoints corresponding to Hypertext Transfer Protocol (HTTP) requests and responses. The input data can also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 540 can define an ADM for the web application as a three-tier application including a first EPG comprising the first endpoints, a second EPG comprising the second endpoints, and a third EPG comprising the third endpoints.

The presentation module 516 can include an application programming interface (API) or command line interface (CLI) 560, a security information and event management (STEM) interface 562, and a web front-end 564. As the analytics engine 510 processes network traffic and corresponding data and generates analytics data, the analytics data may not be in a human-readable form or it can be too voluminous for a user to navigate. The presentation module 516 can take the analytics data generated by analytics engine 510 and further summarize, filter, and organize the analytics data as well as create intuitive presentations for the analytics data.

In some embodiments, the API or CLI 560 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an API for the programming language Java®, which defines how a client can access a database.

In some embodiments, the SIEM interface 562 can be implemented using Hadoop® Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 564 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 5 illustrates an example configuration of the various components of a network traffic monitoring system, those of skill in the art will understand that the components of the network traffic monitoring system 500 or any system described herein can be configured in a number of different ways and can include any other type and number of components. For example, the sensors 504, the collectors 506, the data mover 508, and the data lake 530 can belong to one hardware and/or software module or multiple separate modules. Other modules can also be combined into fewer components and/or further divided into more components.

Sensors deployed in a network can be used to gather network traffic data related to nodes operating in the network. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics. The network traffic data can be analyzed to provide insights into the operation of the nodes in the network, otherwise referred to as analytics. In particular, discovered application or inventories, application dependencies, policies, efficiencies, resource and bandwidth usage, and network flows can be determined for the network using the network traffic data.

Additionally, events can be generated for a network fabric. Events can be generated based on operation of a network fabric to provide network service access. For example, events can be generated for switches in a network fabric that fail policy tests. A network environment, as used herein, can begin and/or end on a physical/virtual network interface controller (herein referred to as "NIC"), container overlay network, or applicable endpoint or beginning point for providing network service access.

Currently, there are not systems and methods to integrate events generated in a network fabric with network traffic data from non-fabric sources such physical servers, virtual servers/VMs/Containers or appliances using the network or any distributed sensors that are on those systems using the fabric. This leads to deficiencies in providing assurance across an entire network. More specifically, this leads to deficiencies in providing assurance across servers and an SDN infrastructure/ACI of a network. For example, a server might appear to be functioning properly according to network traffic data while the server is actually incompatible with a network fabric thereby limiting an ability of the server to provide access to network services using the network fabric.

FIG. 6 illustrates an example network environment 600 that a cross-domain assurance system 608 can provide assurance across. The network environment 600 includes a first leaf 602-1 and a second leaf 602-2 (herein referred to as "leafs 602"). The leafs 602 can form part of a network infrastructure 604. The leafs 602 function as leafs 602 by forwarding network traffic in the network environment 600. The leafs 602 are coupled to a first server 606-1 and a second server 606-2 (herein referred to as "servers 602") at an edge of the network environment 606. The servers 606 can function to provide clients access to network services through the network environment 600. Specifically, the servers 606 can receive network traffic from a client and send network traffic to the client as part of providing network service access to the client.

In the example network environment 600 shown in FIG. 6, the first leaf 602-1 is directly connected to the first server 606-1 and the second server 606-2. As a result, the first server 606-1 and the second server 606-2 can provide access to network services using the first leaf 602-1. Additionally, in the example network environment shown in FIG. 6, the second leaf 602-2 serves as a standby leaf for the second server 606-2 and can be configured to transfer network traffic to and from the second server 606-2. For example, the second leaf 602-2 can transfer network traffic to and from the second server 606-2 when a buffer overrun is detected at a specific client attempting to access network services through the first server 606-1.

The cross-domain assurance system 608 functions to provide assurance in the network environment 600 across both the network infrastructure 604 and the servers 606. The cross-domain assurance system 608 can be implemented within the network environment 600. For example, all or portions of the cross-domain assurance system 608 can be implemented at either or both the network infrastructure 604 and the servers 606. Additionally, the cross-domain assurance system 608 can be implemented remote from the network environment 600, e.g. as a cloud-based system.

The cross-domain assurance system 608 can receive data indicating network events occurring in the network infrastructure 604. Network events can include events related to operation of a network environment, such as the events described herein. For example, the cross-domain assurance system 608 can receive a network event occurring within a specific logical tenant space on a specific router indicating the router has failed a policy test. The cross-domain assurance system 608 can receive a plurality of network events generated at an epoch, e.g. each epoch of a configurable periodicity. Network events received by the cross-domain assurance system 608 can be generated, collected, or otherwise identified by a controller, application, or appliance, e.g. assurance appliance 300.

A network event can indicate an event state associated with the network event. An event state indicates a grade or subject associated with a network event. For example, an event state of a network event can indicate whether the network event is a passing event, a failing event, an informational event, or an error event.

Network events can be generated in response to checks performed in a network environment, e.g. at a configurable periodicity. For example, a network event can be generated in response to performing a policy check on an EPG in a network environment. Additionally, network events can be generated based on operation of a network environment. For example, a network event can indicate an error occurred during operation of a network environment within a specific logical location in a tenant space in the network environment. A network event can include can include one or a combination of values of parameters defining the network event, an event state associated with the network event, a generated error or warning, a log, and stimuli and circumstances that led to creation of the network event.

Network events and indicated event states can be associated with or otherwise classified by event categories. Event categories can be defined according to characteristics of a network environment in operation causing creation of corresponding network events. Examples of event categories include policy events, tenant routing events, configuration violation events, logical lint events, and forwarding events. For example, if a failure event is created in response to a bridge domain failing to adhere to a policy during a policy check, then the event can be classified as a failed policy event. In another example, if a network device in a tenant logical space passes a forwarding or routing check, then the event can be characterized as a passing forwarding event.

Either or both event states and event categories can be indicated by specific event codes associated with network events. For example, a network event can be associated with a failing event code indicating the event is a failing event. In another example, a network event can be associated with a passing forwarding event code indicating the event is a passing forwarding event, e.g. the event is created in response to a passed forwarding test and/or data is being forward through a logical portion of a network environment.

A network event can be defined by values of parameters of a network environment. Parameters of a network environment include parameters that define characteristics of a network environment through creation and maintenance of the network environment. For example, parameters of a network environment can include a model, e.g. a logical model, which can be deployed into a network fabric forming a network environment. Specifically, parameters of a network environment can include parameters that define a network environment on one or a combination of a network layer, a logical layer, and a physical layer.

Parameters that define a network environment on a network layer can include network hierarchy parameters that form a hierarchy of network parameters. Specifically, parameters of a network environment can include an identification of a tenant, e.g. in a network layer, a bridge domain, and a virtual routing and forwarding instance. For example, values of parameters defining a network environment on a network layer can include a specific VRF of a specific tenant in which a network event associated with a forwarding failure occurs.

Parameters defining a network environment on a logical layer can include logical hierarchy parameters that form a hierarchy of logical parameters. Specifically, parameters of a network environment can include an identification of a tenant, e.g. in a local layer, an application profile, and an identification of an endpoint group. For example, values of parameters defining a network environment on a logical layer can include a specific application executing for a specific endpoint group in which a network event associated with a policy failure occurs.

Parameters defining a network environment on a physical layer can include physical hierarchy parameters that form a hierarchy of physical parameters. Specifically, parameters of a network environment can include characteristics of a device, an identification of a network device, and characteristics of a physical port. For example, values of parameters defining a network environment on a physical layer can include a specific port used to transmit data about which a network event is created, and an indication of whether a physical device which includes the port is a spine router or a leaf.

Additionally, the cross-domain assurance system 608 can receive network traffic data for the servers 606. The cross-domain assurance system 608 can receive network traffic data from an applicable system for monitoring network traffic flows at the servers 606, such as the network traffic monitoring system 500. Additionally, the cross-domain assurance system 608 can receive network traffic data generated using a sensor implemented in the network environment 600. For example, the cross-domain assurance system 608 can receive network traffic data generated using sensors implemented at the servers 606.

Further, the cross-domain assurance system 608 can receive server data included as part of network traffic data. Server data can include applicable information related to operation of a server in providing access to network services. For example, server data can identify failed ports on a server. In another example, server data can identify different VLANs used by a server to provide access to network services. Server data included as part of network traffic data and received by the cross-domain assurance system 608 can be generated by a sensor implemented in the network environment 600. For example, server data for the servers 606 that is received by the cross-domain assurance system 608 can be generated by a sensor implemented at the servers 606.

The cross-domain assurance system 608 can use received network traffic data and received network events to provide network assurance across the network environment 600. More specifically, the cross-domain assurance system 608 can use received network traffic data and received network events to provide assurance for a combination of both the network infrastructure 604 and the servers 606. For example, the cross-domain assurance system 608 can determine that bond interfaces on the first leaf 602-1 are configured to properly communicate over a bonded connection with bond interfaces on the first server 606-1.

In providing cross-domain assurance in the network environment 600, the cross-domain assurance system 608 can correlate received network traffic data with received network events to generate correlated network data. Correlated network data can include network events occurring in a network environment 600 and network traffic data corresponding to the events in the network environment 600. Network traffic data and network events can correspond to each other and subsequently be correlated together based on one or a combination of physical locations in the network environment 600 associated with the events and traffic, logical locations in the network environment 600 associated with the events and traffic, and characteristics of network operation associated with the event and traffic. For example, the cross-domain assurance system 608 can correlate the first leaf 602-1 failing a policy test with statistics of packets used in communications between the first server 606-1 and the first lead router 602-1. In another example, the cross-domain assurance system 608 can correlate packets sent by the first server 606-1 to the first leaf 602-1 in a given timeframe with packets received by first leaf 602-1 from the first server 606-1. Accordingly, the cross-domain assurance system 608 can provide assurance across the first server 606-1 and the first leaf 602-1, e.g. that the first leaf 602-1 is receiving all packets sent to it by the first server 606-1.

Additionally, in providing cross-domain assurance in the network environment 600, the cross-domain assurance system 608 can compare intents of network administrators in configuring and controlling the network infrastructure 604 with intents of server administrators in configuring and controlling the servers 606. Intent of network administrators and server administrators can include how the administrators have configured the network infrastructure 604 and the servers 606 to operate. For example, intent of a server administrator can include policies implemented at the first server 606-1 by the server administrator. In comparing intents of network and server administrators, the cross-domain assurance system 608 can determine mismatches between intent of network administrators of the network infrastructure 604 and intent of server administrators of the servers 606. For example, the cross-domain assurance system 608 can determine a policy for controlling bonding across interfaces of the first leaf 602-1 is incompatible with a policy for controlling bonding across interfaces of the first server 606-1.

The cross-domain assurance system 608 can use received network events and network traffic data to compare intents of the administrators of the network infrastructure 604 and intents of administrators of the servers 606. For example, the cross-domain assurance system 608 can use received network events to identify intent of a network administrator for the network infrastructure 604. In another example, the cross-domain assurance system 608 can use received network traffic data to identify intent of a server administrator of the servers 606. The cross-domain assurance system 608 can use correlated network data to compare intents of the administrators of the network infrastructure 604 and intents of the administrators of the servers 606. For example, the cross-domain assurance system 608 can use correlated network data to identify and subsequently compare intent of a network administrator for the first leaf 602-1 and a corresponding intent of an administrator of the first server 606-1.

Further, the cross-domain assurance system 608 can use correlated network data to provide assurance in a VLAN. More specifically, the cross-domain assurance system 608 can use correlated network data to provide assurance in a VLAN between either or both multiple leafs and multiple servers. For example, if the first server 606-1 is communicating with the first leaf 602-1 and the second leaf 602-2 in a VLAN, then the cross-domain assurance system 608 can provide assurance in the VLAN between the first server 606-1, the first leaf 602-1, and the second leaf 602-2.

FIG. 7 illustrates an example cross-domain assurance system 700. The example cross-domain assurance system 700 shown in FIG. 7 can function to provide assurance across a network environment. Specifically, the cross-domain assurance system 700 can provide assurance across both a network infrastructure and servers configured to provide clients network service access using the network infrastructure. The example cross-domain assurance system 700 includes a network data correlator 702, a cross-domain assurance analyzer 704, and a cross-domain historical assurance recorder 706.

The network data correlator 702 functions to correlate network events with network traffic data. In correlating network events with network traffic data, the network data correlator 702 can receive both network events and network traffic data and subsequently correlate the network events with the network traffic data to generate correlated network data. For example, the network data correlator 702 can receive network events generated by an applicable network assurance appliance, such as the appliance shown in FIG. 3A, and subsequently correlate the network events with received network traffic data. In another example, the network data correlator 702 can receive network traffic data from an applicable network traffic monitoring system, such as the network traffic monitoring system 500 shown in FIG. 5, and subsequently correlated the network traffic data with received network events. The network data correlator 702 can correlate server data included as part of received network traffic data with received network events to generate correlated network events. For example, the network data correlator 702 can correlate server data including IP addresses of clients a server is providing access to network services, with events occurring in a network infrastructure.

The network data correlator 702 can correlate network events with network traffic data based on physical locations of devices within a network environment. For example, the network data correlator 702 can correlate network events of leafs in a specific datacenter with network traffic data of servers in the specific datacenter. Additionally, the network data correlator 702 can correlate network events with network traffic data based on logical locations of devices within a network environment. For example, the network data correlator 702 can correlate network events occurring at switches in a VLAN with network traffic data of switches in the VLAN.

Further, the network data correlator 702 can correlate network events with network traffic data based on operation, in combination, of a network infrastructure and servers to provide access to network services. For example, network events and network traffic data generated in response to a specific application in a network environment can be correlated together. Additionally, the network data correlator 702 can correlate network events with network traffic data generated during a specific time frame. For example, if a specific client is accessing network services in a specific instance, then the network data correlator 702 can correlate network events and network traffic data generated in response to the client accessing network services in the instance. In another example, if specific network traffic data indicates a server sent a specific number of data packets within a specific timeslot, then the network data correlator 702 can correlate network events indicating the number of packets received in a network infrastructure from the server within the timeslot with the network traffic data.

The network data correlator 702 can correlate network events with network traffic data based on one or more known data schemas of the network events and the network traffic data. More specifically, network events and network traffic data can be in the same data schema. Subsequently, common or shared data between network events and network traffic data in the data schema can be joined as part of correlating the network events and the network traffic data. For example, network events occurring in an ACI fabric for a specific application can be correlated with network traffic flows at servers for the application, as indicated by a common identification of the application in the network events and the network traffic data.

The cross-domain assurance analyzer 704 functions to provide cross-domain assurance in a network environment. The cross-domain assurance analyzer 704 can provide cross-domain assurance across a network infrastructure of a network environment and servers at the edge of the network environment. This is advantageous as from a perspective of a network infrastructure, the routers and switches in the infrastructure can appear to be compatible with servers at the edge of a network environment, when in actuality, the routers and switches are incompatible with the servers. Similarly, from a perspective of servers at the edge of a network environment, the servers can appear to be compatible with a network infrastructure, when in actuality, the servers are incompatible with the network infrastructure.

The cross-domain assurance analyzer 704 can utilize correlated network data generated by the network data correlator 702 to provide cross-domain assurance. More specifically, the cross-domain assurance analyzer 704 can analyze correlated network data to provide cross-domain assurance. For example, the cross-domain assurance analyzer 704 can analyze correlated network data to identify where ports are failing on a server communicating with a leaf in a network infrastructure. In another example, the cross-domain assurance analyzer 704 can analyze correlated network data to identify instances when a server and a network infrastructure have incompatible policies implemented thereon. The cross-domain assurance analyzer 704 can analyze correlated network data generated from one or a combination of network events, network traffic data, and server data included as part of the network traffic data to provide cross-domain assurance. For example, the cross-domain assurance analyzer 704 can analyze interfaces at both servers and a network infrastructure to ensure the servers and the network infrastructure can communicate.

Additionally, the cross-domain assurance analyzer 704 can utilize past correlated network data generated by the network data correlator 702 to provide cross-domain assurance. More specifically, the cross-domain assurance analyzer 704 can use either or both past network events and past network traffic data, included as part of correlated network data, to provide cross-domain assurance. For example, the cross-domain assurance analyzer 704 can analyze a timeline of network events occurring in a network fabric to provide cross-domain assurance for a network environment.

The cross-domain assurance analyzer 704 can analyze policies implemented between servers and a network infrastructure in providing network services, as part of providing cross-domain assurance. More specifically, the cross-domain assurance analyzer 704 can analyze link aggregation policies between servers and a network infrastructure to determine if the link aggregation policies implemented at the servers and the network infrastructure match or are otherwise compatible. For example, the cross-domain assurance analyzer 704 can ensure that both a network infrastructure and servers are configured to unconditionally use link aggregation to communicate. Further, the cross-domain assurance analyzer 704 can analyze link aggregation policies between servers and a network infrastructure to determine if the servers and the network infrastructure are properly configured to implement one or more link aggregation policies. For example, the cross-domain assurance analyzer 704 can analyze states of bond interfaces in both a network infrastructure and servers to ensure bond connections are properly configured. Identified discrepancies in both policies implemented between servers and a network infrastructure and configurations of the servers and the network infrastructure implementing the policies can be reported to an applicable person or entity, e.g. a network administrator and a server administrator.

In providing cross-domain assurance, the cross-domain assurance analyzer 704 can analyze common transmission and receipt parameters established between servers and a network infrastructure. More specifically, the cross-domain assurance analyzer 704 can analyze common transmission parameters established between servers and devices in network infrastructure to identify mismatches in autonegotiations between the servers and the network infrastructure. Specifically, in identifying mismatches in autonegotiations, the cross-domain assurance analyzer 704 can identify mismatches between one or a combination of speed settings, duplex modes, and flow controls between a server and a network infrastructure. Mismatches in common transmission parameters identified by the cross-domain assurance analyzer 704 can subsequently be reported to an applicable person or entity, e.g. a network administrator and a server administrator.

Further, in providing cross-domain assurance, the cross-domain assurance analyzer 704 can analyze configurations of servers and devices in a network infrastructure. More specifically, the cross-domain assurance analyzer 704 can analyze configurations of servers and devices in a network infrastructure in operating to provide access to network services to identify mismatches between the configurations. For example, the cross-domain assurance analyzer 704 can identify instances when a server and a leaf communicating with each other have incompatible security and forwarding policies implemented thereon. In another example, the cross-domain assurance analyzer 704 can identify mismatches between forwarding planes of servers and a network infrastructure as part of mismatches in configurations of the servers and devices in the network infrastructure. Mismatches in configurations between servers and devices in a network infrastructure identified by the cross-domain assurance analyzer 704 can subsequently be reported to an applicable person or entity, e.g. a network administrator and a server administrator.

In providing cross-domain assurance, the cross-domain assurance analyzer 704 can analyze communications between servers and a network infrastructure. More specifically, the cross-domain assurance analyzer 704 can analyze packets sent by a specific server to a specific physical or logical location in a network infrastructure. Further, the cross-domain assurance analyzer 704 can analyze packets received by the specific physical or logical location in the network infrastructure from the specific server. Accordingly, the cross-domain assurance analyzer 704 can analyze a number of packets sent by a server and a number of packets received by a network infrastructure from the server in order to identify mismatches in the number of packets sent and the number of packets received. Mismatches between a number of packets sent by a server and a number of packets received in a network infrastructure can indicate failing connections between the server and the network infrastructure, e.g. configuration mismatches. Accordingly, identified mismatches between a number of packets sent and a number of packets received can be reported to an applicable person or entity, e.g. a network administrator and a server administrator.

Additionally, in providing cross-domain assurance, the cross-domain assurance analyzer 704 can analyze transmit and receive buffer states between servers and a network infrastructure. More specifically, the cross-domain assurance analyzer 704 can detect buffer overruns occurring in a network environment as part of providing cross-domain assurance for the network environment. For example, the cross-domain assurance analyzer 704 can analyze correlated network data to identify transmit and receive buffer overruns occurring at either or both a server and a network infrastructure. Further, the cross-domain assurance analyzer 704 can identify applications associated with identified buffer overruns, as part of providing cross-domain assurance. For example, the cross-domain assurance analyzer can analyze network traffic data for a specific application to identify the application is causing a buffer overrun at one or more servers. Identified buffer overruns and devices and applications associated with the buffer overruns can be reported to an applicable person or entity, e.g. a network administrator and a server administrator. For example, an identification of a specific server experiencing a buffer overrun can be reports to a server administrator.

In providing cross-domain assurance, the cross-domain assurance analyzer 704 can use one or more application dependency mappings. More specifically, the cross-domain assurance analyzer 704 can use application dependency mappings to map applications to events, e.g. network events, in a network environment. For example, the cross-domain assurance analyzer 704 can use an application dependency mapping to map an application to specific network traffic and ports at a server and a network infrastructure used to transfer the network traffic. Further in the example, the cross-domain assurance analyzer 704 can use correlated network data to identify the statuses or configurations of the ports, as part of providing cross-domain assurance for the application.

The cross-domain historical assurance recorder 706 functions to maintain records of cross-domain assurance in a network environment. More specifically, the cross-domain historical assurance recorder 706 can maintain cross-domain assurance records in a network, as determined by the cross-domain assurance analyzer 704, for different logical locations, physical locations, applications, and devices. For example, the cross-domain historical assurance recorder 706 can maintain an assurance record across a network environment for a specific application in the network environment. In another example, the cross-domain historical assurance recorder 706 can maintain an assurance record between a specific server and leaf in a network environment.

In maintaining assurance records, the cross-domain historical assurance recorder 706 can assign assurance levels based on cross-domain assurances analyzed by the cross-domain assurance analyzer 704. For example, if servers and a portion of a network infrastructure have incompatible configurations, then the cross-domain historical assurance recorder 706 can assign a low assurance level to the servers and the portion of the network infrastructure. The cross-domain historical assurance recorder 706 can assign assurance levels based on one or a combination of analyzed policies implemented between servers and a network infrastructure, analyzed common transmission and receipt parameters established between servers and a network infrastructure, analyzed configurations of servers and devices in a network infrastructure, analyzed communications between servers and a network infrastructure, and analyzed transmit and receive buffer states between servers and a network infrastructure. For example, if servers and a network infrastructure have compatible or the same link aggregation policies, then the cross-domain assurance analyzer 704 can assign a high level of assurance to the servers and the infrastructure.

The cross-domain historical assurance recorder 706 can maintain timelines of assurance, e.g. assurance levels. More specifically, the cross-domain historical assurance recorder 706 can maintain a timeline of assurance levels as the assurance levels change. A timeline of assurance levels, maintained by the cross-domain historical assurance recorder 706 can be specific to one of a physical location in a network environment, a logical location in a network environment, applications, and devices in a network environment. For example, the cross-domain historical assurance recorder 706 can maintain a timeline of assurance levels between a specific server and a specific portion of a network infrastructure.

FIG. 8 illustrates a flowchart for an example method of providing cross-domain assurance in a network environment. The method shown in FIG. 8 is provided by way of example, as there are a variety of ways to carry out the method. Additionally, while the example method is illustrated with a particular order of blocks, those of ordinary skill in the art will appreciate that FIG. 8 and the blocks shown therein can be executed in any order and can include fewer or more blocks than illustrated.

Each block shown in FIG. 8 represents one or more steps, processes, methods or routines in the method. For the sake of clarity and explanation purposes, the blocks in FIG. 8 are described with reference to the example cross-domain assurance system 700 shown in FIG. 7.

At step 800, the cross-domain assurance system 700 receives network traffic data of a cluster of nodes in a network environment gathered based on first network traffic flowing through the cluster of nodes. The network traffic data can be generated using sensors implemented in the network environment. For example, the network traffic data can be generated using sensors implemented at the cluster of nodes. Additionally, the network traffic data can be generated by and received from an applicable network traffic monitoring system, such as the network traffic monitoring system 500 shown in FIG. 5. Network traffic data received at step 800 can include server data. For example, network traffic data received at step 800 can include server data indicating one or a combination of interface statistics of a server, port properties of a server, configurations of a server, and bonding and channel configurations of a server.

At step 802, network events occurring in the network environment are identified. An applicable appliance can identify network events occurring in the network environment, such as the assurance appliances described herein. The network events can be generated based on operation and configurations of a network infrastructure/network fabric. For example, the network events can be generated based on configurations of leafs and policies implemented at the leafs. Additionally, the network events can include one or a combination of hardware and logic states of devices in a network fabric, forwarding plane information of a network fabric, protocols implemented at devices in a network fabric, and ports statistics of devices in a network fabric.

At step 804, the network data correlator 702 correlates the network events and the network traffic data to generate correlated network traffic data for the network environment. The network events and the network traffic data can be correlated based on operation, in combination, of a network infrastructure and servers. For example, network traffic data for a server in the cluster of nodes can be correlated with network events occurring in a network fabric related to communications between the server and the network fabric. Additionally, the network events and the network traffic data can be correlated based on one one or more data schemas of the network events and the network traffic data. For example, events sharing common terms with network traffic data, as identified by one or more data schemas, can be joined together as part of correlating the network events and the network traffic data.

At step 806, the cross-domain assurance analyzer 704 provides assurance between at least one server included in the cluster of nodes and a network infrastructure of the network environment using the correlated network data. More specifically, assurance can be provided between the at least one server and the network infrastructure as part of providing cross-domain assurance for the network environment. Assurance between the at least one server included in the cluster of nodes and the network infrastructure can be provided based on analyzed policies implemented between the server and the network infrastructure, analyzed common transmission and receipt parameters established between the server and the network infrastructure, analyzed configurations of the server and devices in the network infrastructure, analyzed communications between the server and the network infrastructure, and analyzed transmit and receive buffer states between the server and the network infrastructure.

The disclosure now turns to FIGS. 9 and 10, which illustrate example network devices and computing devices, such as switches, routers, load balancers, client devices, and so forth.

FIG. 9 illustrates an example network device 900 suitable for performing switching, routing, load balancing, and other networking operations. Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 904 to efficiently perform routing computations, network diagnostics, security functions, etc.

Although the system shown in FIG. 9 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC), which can be configured to perform routing and/or switching operations. The ASIC can communicate with other components in the network device 900 via the bus 910, to exchange data and signals and coordinate various types of operations by the network device 900, such as routing, switching, and/or data storage operations, for example.

FIG. 10 illustrates a computing system architecture 1000 wherein the components of the system are in electrical communication with each other using a connection 1005, such as a bus. Exemplary system 1000 includes a processing unit (CPU or processor) 1010 and a system connection 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
receiving network traffic data of a cluster of nodes in a server domain in a network environment gathered based on first network traffic flowing through the cluster of nodes using a first group of sensors implemented in the network environment;
identifying network events occurring in a network infrastructure domain separate from the server domain in the network environment;
correlating the network events and the network traffic data across the server domain and the network infrastructure domain to generate correlated network data for the network environment, wherein the network events and the network traffic data are correlated based on either or both corresponding locations of the network events and sources of the network traffic data across the server domain and the network infrastructure domain and characteristics of network operations associated with the network events and the network traffic data across the server domain and the network infrastructure domain; and
providing assurance between at least one server included in the cluster of nodes in the network environment and the network infrastructure domain of the network environment using the correlated network data.

2. The method of claim 1, wherein the correlated network data is used to identify a mismatch between intent of a network administrator of the network infrastructure and a server administrator of the at least one server as part of providing assurance between the at least one server and the network infrastructure.

3. The method of claim 1, further comprising:
receiving server data of the at least one server from at least one sensor implemented on the at least one server;
correlating the network events, the network traffic data, and the server data to generate the correlated network data; and
providing the assurance between the at least one server and the network infrastructure of the network environment based, at least in part, on the server data using the correlated network data created, at least in part, using the server data.

4. The method of claim 3, further comprising detecting configuration mismatches between the at least one server and one or more switches in the network infrastructure using the correlated network data as part of providing assurance between the at least one server and the network infrastructure.

5. The method of claim 3, further comprising:
detecting a buffer overrun in operation of the network environment using the correlated network data; and
identifying an application associated with the buffer overrun using the correlated network data as part of providing assurance between the at least one server and the network infrastructure.

6. The method of claim 5, further comprising identifying a specific server of the at least one server associated with the buffer overrun using the correlated network data as part of providing assurance between the at least one server and the network infrastructure.

7. The method of claim 3, further comprising determining if a link aggregation policy implemented between the at least one server and the network infrastructure is configured correctly using the correlated network data as part of providing assurance between the at least one server and the network infrastructure of the network environment using the correlated network data.

8. The method of claim 7, further comprising determining, using the correlated network data, if a configuration of the at least one server to implement the link aggregation policy matches a configuration of the network infrastructure to implement the link aggregation policy as part of determining if the link aggregation policy implemented between the at least one server and the network infrastructure is configured correctly using the correlated network data.

9. The method of claim 1, further comprising detecting mismatches in autonegotiations between the at least one server and the network infrastructure using the correlated network data as part of providing assurance between the at least one server and the network infrastructure.

10. The method of claim 1, wherein the network events and the network traffic data is correlated by joining first data in the network events and second data in the network traffic data, the first data in the network events having shared data with the second data in the network traffic data.

11. The method of claim 1, further comprising determining if a number of data packets received from the at least one server at one or more switches in the network infrastructure matches a number of data packets sent by the at least one server using the correlated network data as part of providing assurance between the at least one server and the network infrastructure.

12. The method of claim 1, further comprising mapping the network events to applications, using application dependency mappings included in the correlated network data, wherein mappings of the network events to applications are used in providing assurance between the at least one server and the network infrastructure of the network environment using the correlated network data.

13. The method of claim 1, further comprising maintaining a timeline of assurance levels between the at least one server and the network infrastructure of the network environment using the correlated network data as part of providing assurance between the at least one server and the network infrastructure of the network environment using the correlated network data.

14. The method of claim 1, further comprising determining if a port is failing at the at least one server using the correlated network data.

15. A system comprising:
one or more processors; and
at least one computer-readable storage medium having stored therein instructions which, when executed by the one or more processors, cause the one or more processors to perform operations comprising:
receiving network traffic data of a cluster of nodes in a server domain in a network environment gathered based on first network traffic flowing through the cluster of nodes using a first group of sensors implemented in the network environment;
receiving server data, included as part of the received network traffic data, of at least one server included in the cluster of nodes in the server domain in the network environment from at least one sensor implemented on the at least one server;
identifying network events occurring in a network infrastructure domain separate from the server domain in the network environment;
correlating the network events, the server data, and the network traffic data across the server domain and the network infrastructure domain to generate correlated network data for the network environment, wherein the network events and the network traffic data are correlated based on either or both corresponding locations of the network events and sources of the network traffic data across the server domain and the network infrastructure domain and characteristics of network operations associated with the network events and the network traffic data across the server domain and the network infrastructure domain; and
providing assurance between the at least one server and the network infrastructure domain of the network environment using the correlated network data.

16. The system of claim 15, wherein the correlated network data is used to identify a mismatch between intent of a network administrator of the network infrastructure and a server administrator of the at least one server as part of providing assurance between the at least one server and the network infrastructure.

17. The system of claim 15, wherein the instructions which, when executed by the one or more processors, further cause the one or more processors to perform operations comprising detecting configuration mismatches between the at least one server and one or more switches in the network infrastructure using the correlated network data as part of providing assurance between the at least one server and the network infrastructure.

18. The system of claim 15, wherein the instructions which, when executed by the one or more processors, further cause the one or more processors to perform operations comprising:
detecting a buffer overrun in operation of the network environment using the correlated network data; and
identifying an application associated with the buffer overrun using the correlated network data as part of providing assurance between the at least one server and the network infrastructure.

19. The system of claim 15, wherein the instructions which, when executed by the one or more processors, further cause the one or more processors to perform operations comprising determining if a link aggregation policy implemented between the at least one server and the network infrastructure is configured correctly using the correlated network data as part of providing assurance between the at least one server and the network infrastructure of the network environment using the correlated network data.

20. A non-transitory computer-readable storage medium having stored therein instructions which, when executed by a processor, cause the processor to perform operations comprising:
receiving network traffic data of a first cluster of nodes in a server domain in a network environment gathered based on first network traffic flowing through the first cluster of nodes using a first group of sensors implemented in the network environment;
identifying network events occurring in a network infrastructure domain separate from the server domain in the network environment;
correlating the network events and the network traffic data across the server domain and the network infrastructure domain to generate correlated network data for the network environment, wherein the network events and the network traffic data are correlated based on either or both corresponding locations of the network events and sources of the network traffic data across the server domain and the network infrastructure domain and characteristics of network operations associated with the network events and the network traffic data across the server domain and the network infrastructure domain; and
providing assurance between at least one server and a network infrastructure of the network environment using the correlated network data by identifying a mismatch between intent of a network administrator of the network infrastructure and a server administrator of at least one server of the network environment.

* * * * *